(12) United States Patent
Selwyn et al.

(10) Patent No.: US 10,919,647 B2
(45) Date of Patent: Feb. 16, 2021

(54) COMPOSITION AND PROCESS FOR APPLYING HYDROPHOBIC COATING TO FIBROUS SUBSTRATES

(71) Applicant: Green Theme Technologies LLC, Albuquerque, NM (US)

(72) Inventors: Gary S. Selwyn, Albuquerque, NM (US); Chris B. Cooper, Albuquerque, NM (US); Luther Wilburn Cox, Albuquerque, NM (US)

(73) Assignee: Green Theme Technologies, Inc., Rio Rancho, NM (US)

( * ) Notice: Subject to any disclaimer, the term of this patent is extended or adjusted under 35 U.S.C. 154(b) by 596 days.

(21) Appl. No.: 15/121,014

(22) PCT Filed: Feb. 24, 2015

(86) PCT No.: PCT/US2015/017400
§ 371 (c)(1),
(2) Date: Aug. 23, 2016

(87) PCT Pub. No.: WO2015/127479
PCT Pub. Date: Aug. 27, 2015

(65) Prior Publication Data
US 2017/0225799 A1 Aug. 10, 2017

(51) Int. Cl.
*B64F 1/00* (2006.01)
*B64C 39/02* (2006.01)
*B64C 29/02* (2006.01)
*G05D 1/00* (2006.01)
*G05D 1/10* (2006.01)
*G08G 5/00* (2006.01)

(52) U.S. Cl.
CPC .............. *B64F 1/005* (2013.01); *B64C 29/02* (2013.01); *B64C 39/024* (2013.01); *G05D 1/0011* (2013.01); *G05D 1/0022* (2013.01); *G05D 1/102* (2013.01); *G08G 5/0091* (2013.01); *B64C 2201/021* (2013.01); *B64C 2201/042* (2013.01);
(Continued)

(58) Field of Classification Search
CPC ..... B64F 1/005; G05D 1/0011; G05D 1/0022; G05D 1/102; B64C 29/02; B64C 39/024; B64C 2201/021; B64C 2201/042; B64C 2201/088; B64C 2201/104; B64C 2201/2201; B64C 2201/108;
(Continued)

(56) References Cited

U.S. PATENT DOCUMENTS 4,193,762 A 3/1980 Namboodri
4,559,150 A 12/1985 Becker
(Continued)

FOREIGN PATENT DOCUMENTS

GB 1246806 A 9/1971
GB 1357029 A 6/1974
(Continued)

*Primary Examiner* — Robert S Walters, Jr.

(57) ABSTRACT

Fabrics are treated with a hydrophobic treatment that includes at least one hydrophobic monomer and a crosslinker. The treatment is low in volatile organic compounds and water. It is a liquid at 22° C. or a suspension having a phase that is liquid at 22° C. The monomer and crosslinker are cured in a free radical polymerization to form a hydrophobic coating on a fibrous substrate. The curing is performed by removing interstitial air from the fabric and then curing the fabric in a low oxygen environment without allowing it contact with oxygen or air from the time the interstitial air is removed until conversion of monomers reaches at least 50%.

9 Claims, 2 Drawing Sheets

(52) U.S. Cl.
CPC .. *B64C 2201/088* (2013.01); *B64C 2201/104* (2013.01); *B64C 2201/108* (2013.01); *B64C 2201/141* (2013.01); *B64C 2201/146* (2013.01); *B64C 2201/165* (2013.01); *B64C 2201/201* (2013.01)

(58) Field of Classification Search
CPC ........ B64C 2201/141; B64C 2201/146; B64C 2201/165; B64C 2201/201; G08G 5/0091
See application file for complete search history.

(56) References Cited

U.S. PATENT DOCUMENTS

| | | |
|---|---|---|
| 4,868,262 A | 5/1989 | Esselborn |
| 7,056,845 B2 | 6/2006 | Waeber |
| 7,790,238 B2 | 9/2010 | Keller |
| 7,955,518 B2 | 6/2011 | Keller |
| 2003/0153225 A1 | 8/2003 | Sugo |
| 2005/0085150 A1 | 4/2005 | Hamed |
| 2009/0028916 A1 | 1/2009 | Petit |
| 2009/0137171 A1 | 5/2009 | Waeber |
| 2009/0192239 A1 | 7/2009 | Hecht |
| 2009/0318044 A1 | 12/2009 | Butz |
| 2010/0255210 A1 | 10/2010 | Falkowski |
| 2011/0201728 A1 | 8/2011 | Yamamoto |
| 2015/0140413 A1 | 5/2015 | Suzuki et al. |

FOREIGN PATENT DOCUMENTS

| | | |
|---|---|---|
| JP | H03-206186 A | 9/1991 |
| KR | 2008068297 A | 7/2008 |
| WO | 2012/085706 A | 6/2012 |

COMPOSITION AND PROCESS FOR APPLYING HYDROPHOBIC COATING TO FIBROUS SUBSTRATES

The present invention relates generally to a composition and process for applying a hydrophobic or oleophobic coating to a fibrous substrate.

Hydrophobic coatings are applied to fibrous substrates to provide a water-repellant finish for apparel such as rain gear and for a wide variety of industrial, vehicular and construction applications in which it is important to prevent water from wetting or seeping through the substrate.

Oleophobic coatings are applied to fibrous substrate to prevent oil-based liquids from staining or penetrating the substrate. Often oleophobic coatings are also hydrophobic.

The most common way of applying such coatings is by a "pad and cure" method that involves pulling a length of woven or knitted fabric through an aqueous chemical bath, squeezing or vacuuming out the excess liquid and then drying or curing the wet fabric in a long, air-operated oven called a "tenter frame." A finishing solution containing multiple ingredients is used in the chemical bath. This process entails a great many difficulties, including textile shrinkage, inconsistent application of the active ingredients, time-varying changes in the concentration of bath ingredients, the use of large amounts of energy to remove the water, and large amounts of chemical waste water which needs to be recycled or disposed of. In addition, many potential finishing chemicals cannot be coated onto a textile in this manner, because they are not compatible with water or else react prematurely with themselves or other ingredients in the bath, or because they will quickly precipitate out of the bath.

Examples of water-based textile treatment processes include those described, for example, in U.S. Pat. Nos. 4,868,262, 7,056,845, 7,790,238 and 7,955,518 and US Patent Application Publication US2009/0137171. U.S. Pat. No. 4,193,762 describes the use of an aqueous foam that is applied to a textile surface and which uses pressure rollers to break the foam and impregnate the finishing agent into the textile as a step prior to heat-based drying and curing. This treatment process may be done on one or both sides of the textile. As this approach relies upon the use of water-based chemistry, it too is limited by possible chemical reactions between the finishing components and water. US Patent Publication 2011/0201728 discloses a method for free radical polymerization of various monomers and co-polymers that are dispersed in water, but does not teach the use of crosslinkers combined with monomeric ingredients, or the use of a free radical initiator or application of the monomeric mixture on textiles.

US Patent Publication 2008/0090004 describes treating a fabric by dipping it into coating composition, or by spraying a coating composition that contains an organic, liquid solvent. After application of this liquid solvent to the fabric, heat curing is used to finish the treatment and to evaporate the liquid, organic solvent. Similarly, U.S. Pat. No. 4,559,150 describes the use of liquid organic solvents that enable the dissolution of a whitening agent for finishing various textile applications, such as curtains or underwear. The use of organic solvents is undesirable due to worker exposure and environmental issues, as well as added costs for recovery and reuse of the solvents.

US Patent Publication 2008/0107822 describes a method of coating a textile or nonwoven with a nano-scale thickness of vapor-condensed monomers plus additional chemicals, followed by a plasma-based curing method to polymerize the coated monomer. The low molecular weight monomers used in this process cannot easily be cured in an oven due to their volatility.

In the specific field of producing water-repellant fabrics, there is a need for a coating that provides very good water repellency, but which has at most a minor effect on the air permeability of the fabric. This combination of effects would be useful to make garments that shed rainwater easily while remaining breathable. The coated fabric should have good "hand", which is a subjective evaluation of the feel and drape of the fabric. Good "drape" generally requires that the coating weight be quite low, and so the coating material must be capable of delivering the needed water repellency at low coating weights. Despite the low coating weights, the coating must be durable against both abrasion and laundry. Many uses of the coating fabrics (such as in garments) require periodic laundering; in such uses, the coating needs to be able to withstand repeated laundry cycles without being removed from the fabric. In addition to these functional requirements, it is preferred that the coating can be rapidly applied in a continuous process without damaging the underlying fabric. Of course, low treatment cost is also required.

This invention is in a first aspect a curable coating composition comprising a) at least one free radical-curable monomer having exactly one polymerizable group per molecule, the free radical-curable monomer having at least one hydrocarbyl group that has at least eight carbon atoms bonded directly or indirectly to the polymerizable group, the free radical-curable monomer having a boiling point that is equal to or greater than 100° C., and b) at least one crosslinking monomer having at least two free-radical-curable polymerizable groups and a boiling temperature that is equal to or greater than 100° C.;

wherein the coating composition at 22° C. is a liquid or a suspension of one or more solids in a liquid phase.

The coating composition preferably contains no more than 10% by weight of organic compounds that have boiling temperatures below 100° C. and no more than 5% by weight water, based on the entire weight of the coating composition.

The coating composition is easily coated onto a variety of substrates, including fabrics, and cured thereon to form a coating that is highly hydrophobic and water-repellent. The cured coating may also provide an oleophobic treatment that repels oil-based materials or which provides oil-stain release functionality. When cured, it forms a cross-linked, thermoset polymer coating that is very durable and therefore is very resistant to removal by laundering or abrasion. The cured coating composition is effective even when applied at very low coating weights.

The invention is also a coated substrate made by applying the curable coating composition of the invention to at least one surface of a fibrous substrate, and curing the curable coating composition on the substrate.

The invention in a second aspect is a method for coating a substrate, comprising applying a coating composition of the first aspect to at least one surface of the substrate and curing the coating composition by free radical polymerization to form a coated substrate.

The invention in a third aspect is a method for coating a substrate, comprising 1) applying liquid water and a curable coating composition to at least one surface of a fibrous substrate to form a moistened and coated fibrous substrate;

2) heating the moistened and coated fibrous substrate to volatilize the water and produce steam at superatmospheric pressure in contact with the fibrous substrate;

3) simultaneously with and/or after step b), curing the curable coating composition by free-radical polymerization to form a coated substrate, wherein the curable coating composition at the time of application to the fibrous substrate contains no more than 10% by weight of organic compounds that have boiling temperatures below 100° C. and no more than 5% by weight water, based on the entire weight of the coating composition, and further contains a) at least one free-radical-curable monomer having exactly one polymerizable group per molecule, the free-radical-curable monomer having at least one hydrocarbyl group that has at least eight carbon atoms bonded directly or indirectly to the polymerizable group, the free-radical-curable monomer having a boiling temperature that is greater or equal to 100° C. and b) at least one crosslinking monomer having at least two free-radical-curable polymerizable groups and a boiling temperature at of at least 100° C.

The application and volatilization of the water in this process has been found to assist in the penetration of the coating composition between the fibers of a fibrous substrate and at least partially into the interior of the fibers of the fibrous substrate. This leads to a more uniform and effective coating, and it enables the durability of treatment against both laundry removal and abrasion removal. The hydrostatic force created by steam generation helps to "push" the monomeric mixture into the otherwise difficultly-accessible spaces between tightly woven or knitted yarn. In addition, the volatilization of the water is believed to expel air trapped in interstitial void spaces in the fabric. This has unexpectedly been found to lead to faster and more effective curing and superior performance of the cured coating. The absorption of heat by the water as it volatilizes also moderates the temperature of the underlying substrate, which helps to minimize thermal damage during the heating and/or polymerization process.

The invention is in a fourth aspect another method for coating a substrate, comprising 1) applying a curable coating composition to at least one surface of a fibrous substrate to form a coated fibrous substrate;

2) heating the coated fibrous substrate in the presence of a gas or a blowing agent to produce a superatmospheric pressure gas in contact with the substrate;

3) simultaneously with and/or after step b), curing the curing coating composition by free-radical polymerization to form a coated substrate, wherein the curable coating composition at the time of application to the fibrous substrate contains no more than 10% by weight of organic compounds that have boiling temperatures below 100° C. and no more than 5% by weight water, based on the entire weight of the coating composition, and further contains a) at least one free-radical-curable monomer having exactly one polymerizable group per molecule, the free-radical-curable monomer having at least one hydrocarbyl group that has at least eight carbon atoms bonded directly or indirectly to the polymerizable group, the free-radical-curable monomer having a boiling temperature of at least 100° C. and b) at least one crosslinking monomer having at least two free-radical-curable polymerizable groups and a boiling temperature of at least 100° C.

In this embodiment, the superatmospheric pressure gas or blowing agent is believed to force air from the interstitial void spaces between the fibers of the substrate. As with the third aspect, this leads to the production of an effective coating at low coating weights, while favoring a fast and effective cure.

In a fifth aspect, this invention is method for coating a porous fabric having multiple intersecting yarn or fibers that define a web having air-filled interstitial void spaces, comprising 1) applying a curable coating composition to at least one surface of the porous fabric, wherein the curable coating composition contains at least one polymerizable monomer that polymerizes in the presence of free radicals;

2) before, simultaneously with and/or after step 1), removing air from the interstitial void spaces, and then 3) curing the curable coating composition on the porous fabric, wherein the curing is performed in a low oxygen environment until the conversion of monomer(s) is at least 50 mole-percent.

Applicants have unexpectedly found that when coating a fabric with a coating composition that cures in a free radical mechanism, it is important to remove air from interstitial void spaces that exist between the various fibers that make up the fabric. Although the invention is not limited to any theory, it is believed that the oxygen in the air inhibits the free radical polymerization reactions, which leads to long cure times, long exposures to elevated temperatures that can damage the underlying fabric, or even incomplete cures which lead to poor durability or poor water repellency in the coated fabric. Applicants have found that this inhibitory effect is particularly large when coating weights are low and the applied coating is correspondingly thin; this may be due to a mass transfer effect of oxygen through the thin coating layer, which is not seen or is minimal when the coating is thicker. By removing air and therefore oxygen from the interstitial void spaces, the coating can penetrate within fibers or fiber bundles to form a thin coating that penetrates well into the fabric yet cures rapidly to produce an effective and durable coating.

The invention is also a coated substrate or coated porous fabric made in accordance with any of the foregoing processes of the invention.

The invention is also an apparatus for continuously coating a substrate, comprising 1) a section for spraying, roll coating, or immersing a substrate with a liquid phase curable coating composition to at least one surface of a fibrous substrate to form a coated fibrous substrate;

2) a section for heat curing the coated fibrous substrate in low oxygen environment; and 3) a section having not more than 1 mole percent oxygen present and which is not directly heated with sufficient residence time such that the coated fabric cools to 50° C. or less and 4) a roll-up section downstream of 3).

THE CURABLE COATING COMPOSITION OF THE INVENTION

Figure 1:
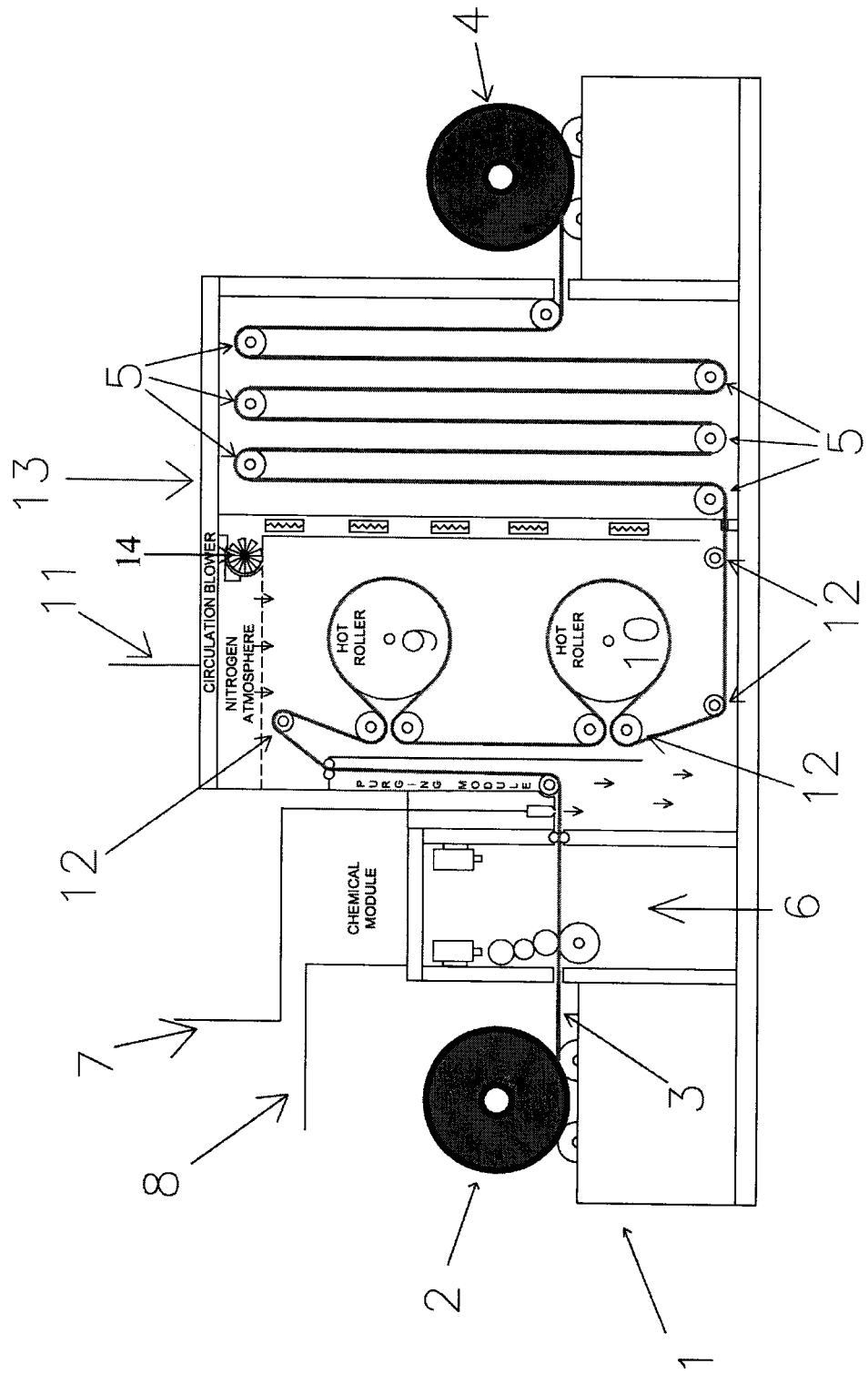
FIG. 1 is a schematic view of an embodiment of the process of the invention.

Component a) is one or more free-radical-curable monomers that have exactly one free-radical-polymerizable group per molecule. The free-radical-curable monomer has at least one hydrocarbyl group that has at least eight carbon atoms bonded directly or indirectly to the polymerizable group. The hydrocarbyl groups may be partially fluorinated or perfluorinated. The free-radical-curable monomer component a) has a boiling temperature of at least 100° C. The boiling temperature preferably is at least 120° C. and more preferably at least 150° C. All boiling temperatures mentioned herein are at one atmosphere pressure.

The component a) monomer or monomers may be liquid or solid at 22° C. If a mixture of component a) monomers is used, they may all be liquids, may all be solids, or they may include a mixture of solid and liquid monomers. In preferred embodiments, component a) is a mixture of at least two monomers, at least one of which is solid at 22° C. and at least one of which is liquid at 22° C.

The free-radical polymerizable group can be any that polymerizes in a free-radical polymerization, but preferably is an alkenyl, acrylate, methacrylate or chlorosilane group. Acrylate and/or methacrylate groups are most preferred.

The hydrocarbyl group may be linear or branched aliphatic, alicyclic, aromatic or a group that contains of two or more thereof. The hydrocarbyl group may contain at least 10 or at least 12 carbon atoms. The hydrocarbyl group may contain, for example, 8 to 24 carbon atoms, or 10 to 20 carbon atoms, or 12 to 18 carbon atoms. In some embodiments, the hydrocarbyl group is a linear alkyl or alkenyl group having 8 to 24, 10 to 20 or 12 to 18 carbon atoms. In some embodiments, the hydrocarbyl group is partially or perfluorinated, and contains 8 to 24, or preferably 10 to 20 carbon atoms.

The hydrocarbyl group may be bonded directly (i.e., through a covalent bond) to the free-radical polymerizable group, or indirectly thereto through a linking group.

The component a) monomer(s) preferably have a solubility in water of no greater than 2 parts by weight, more preferably no greater than 1 parts by weight, and still more preferably no more than 0.25 part by weight, per 100 parts by weight of water, at 30° C. Water preferably is soluble in the component a) monomer(s) to the extent of no greater than 2 parts by weight, more preferably no greater than 1 parts by weight and more preferably no greater than 0.25 part by weight, per 100 parts by weight of the monomer(s), at 30° C.

Examples of component a) monomers include, but are not limited to, one or more of the following: 2-ethylhexyl acrylate, n-octyl acrylate, 2-ethylhexyl acrylate, n-octyl methacrylate, decyl acrylate, decyl methacrylate, lauryl acrylate, lauryl methacrylate, octadecyl acrylate, octadecyl methacrylate, 2-(perfluorohexyl)ethyl acrylate, 2-(perfluorooctyl)ethyl acrylate, 2-(perfluorodecyl)ethyl acrylate, 2-(perfluorohexyl)ethyl methacrylate, 2-(perfluorooctyl) ethyl methacrylate, lauryl methacrylate, stearyl methacrylate, 2-(perfluorodecyl)ethyl methacrylate, 2-(perfluorooctyl)ethyl trichlorosilane and vinyl naphthalene. Among these, the acrylate and methacrylate monomers described above are most preferred.

Component b) is at least one crosslinking monomer having at least two free-radical-curable groups and a boiling temperature of at least 100° C. The boiling temperature preferably is at least 125° C. and more preferably at least 150° C. All boiling temperatures in this specification are at one atmosphere pressure unless otherwise indicated. The crosslinking monomer preferably is a liquid at 22° C. The free-radical-curable polymerizable groups may be as described above with regard to component a), with acrylate or methacrylate groups being preferred. The crosslinking monomers may have, for example 2 to 20, preferably 2 to 8 and more preferably 2 to 6 free-radical-curable groups per molecule. Examples of crosslinking monomers include polyacrylate or polymethacrylate compounds having 2 to 20, preferably 2 to 8 or 2 to 6 acrylate and/or methacrylate groups per molecule. Specific examples include acrylate and/or methacrylate esters of polyols having 2 to 50, 2 to 20 or 4 to 12 carbon atoms, such as 1,4-butanediol diacrylate, 1,6-hexanediol diacrylate, 1,8-octanediol diacrylate, cyclohexane dimethanol diacrylate, trimethylolpropane triacrylate, glycerin triacrylate, pentaerythritol tetraacrylate, dipentaerythritol tetraacrylate, diepentaerythritol hexacrylate, the corresponding methacrylates, and the like. So-called drying oils like linseed oil, safflower oil and tung oil are also useful crosslinkers.

The coating composition may and typically will have one or more optional ingredients in addition to the monomer(s) described above. The selection of ingredients, their proportions and the manner of preparing the composition are all made such that the coating composition is a liquid at 22° C. or a suspension of one or more solids in a liquid phase at 22° C., and the coating composition contains no more than 10% by weight of organic compounds that have boiling temperatures below 100° C. and no more than 5% by weight water, based on the entire weight of the coating composition. The curable coating composition preferably contains no more than 5%, more preferably no more than 2%, still more preferably no more than 1%, and even more preferably no more than 0.25% by weight of organic compounds that have boiling temperatures below 100° C., and no more than 2%, more preferably no more than 1% and still more preferably no more than 0.25% by weight of water.

Among the optional ingredients that may be present in the coating composition are:

c) One or more free-radical-curable monomers different from components a) and b). Such a monomer may have a boiling temperature of below 100° C., and/or may lack a hydrocarbyl group of six or more carbon atoms. Such a monomer may have exactly one free-radical-polymerizable group, or may have more than one such group, in which case it will function as a cross-linker. Such a monomer may be a liquid or solid at 22° C. The component c) monomer, if present, preferably is copolymerizable with the component a) and b) monomers. Preferred free-radical-polymerizable groups on the component c) monomer(s) are acrylate and methacrylate. Examples of component c) monomers include hexyl acrylate, butyl acrylate, hydroxyethyl acrylate, methyl acrylate, ethyl acrylate, hexyl methacrylate, butyl methacrylate, hydroxyethyl methacrylate, methyl methacrylate, ethyl methacrylate, 2-(perfluorobutyl)ethyl acrylate, 2-(perfluorobutyl)ethyl methacrylate, styrene, ethylene benzene, chlorostyrene, and the like.

d) One or more heat- or UV-activated free-radical initiators. Suitable free radical initiators include, for example, 1) acyl peroxides, such as acetyl or benzoyl peroxides, 2) alkyl peroxides, such as cumyl, dicumyl, lauroyl, or t-butyl peroxides, 3) hydroperoxides, such as t-butyl or cumyl hydroperoxides, 4) peresters, such t-butyl perbenzoate, 5) other organic peroxides, including acyl alkylsulfonyl peroxides, dialkyl peroxydicarbonates, diperoxyketals, ketone peroxides, or 1,1-Bis(tert-butylperoxy)-3,3,5-trimethylcyclohexane, 6) azo compounds, such as 2,2'-azobisisobutyronitrile (AIBN) or 2,2'-azobis(2,4-dimethylpentanenitrile), 4,4'-azobis(4-cyanovaleric acid), or 1,1'-azobis(cyclohexanecarbonitrile), 7) various tetrazines and 8) various persulfate compounds, such as potassium persulfate. Free radical initiators that are solids at 22° C. are preferred, as are those having a 10 hour half-life at a temperature of 60° C. or more. Those having a 1 minute half-life temperature of at least 100° C. are especially preferred. The free radical initiators in some embodiments may also have a half-life of at least one minute at 100° C. or a half-life of at least 6 minutes at 100° C.

e) One or more carriers. Useful carriers or mixture of carriers are liquid at 22° C. or else are materials that are solid at 22° C. but-have a melting temperature of 100° C. or less, preferably 50° C. or less. The carrier preferably also has a boiling temperature of at least 100° C., more preferably at least 125° C. and still more preferably at least 150° C. The carrier contains no free-radical-polymerizable groups. Preferred carriers have water-solubility characteristics as described with respect to the component a) monomers. However, the carrier preferably is soluble in or becomes partially entrained into the polymer formed when the coating composition is cured.

Examples of useful carriers are (i) aliphatic monoalcohols or aliphatic monocarboxylic acids having 14 to 30 carbon atoms; (ii) esters of a fatty acid and a fatty alcohol, the ester having 18 to 48 carbon atoms, preferably 20 to 36 carbon atoms; (iii) a polyether having one or more hydroxyl groups; (iv) a polysiloxane, which can be linear, branched or cyclic; (v) a polysiloxane-poly(alkylene glycol) copolymer; (vi) a wax, such as a polyethylene wax, bees wax, lanolin, carnauba wax, candelilla wax, ouricury wax, sugarcane wax, jojoba wax, epicuticular wax, coconut wax, petroleum wax, paraffin wax and the like, especially one having a melting temperature of greater than 22° C., preferably greater than 35° C. but no greater than 100° C., especially no greater than 50° C.; (vii) a fluoropolymer, (viii) solid vegetable and/or animal oils or fats; (viii) another organic oligomer or polymer having a pure phase melting or softening temperature up to 100° C. or (ix) various plasticizers.

Among the aliphatic monoalcohols are fatty alcohols, including saturated fatty alcohols such as 1-dodecanol, 1-tetradecanol, 1-hexadecanol, 1-octadecanol, and the like, as well as fatty alcohols have one or more sites of carbon-carbon unsaturation in the fatty alcohol chain. Among the useful esters of a fatty acid and a fatty alcohol are, for example, hexyl octadecanoate, octyl octadecanoate, dodecyl octadecanoate, hexadodecyl octadecanoate, and the like. The fatty acid and/or fatty alcohol portions of the ester may contain one or more sites of carbon-carbon unsaturation.

Suitable polyethers are polymers of one or more cyclic ethers such as propylene oxide, tetramethylene glycol and the like. The molecular weight is high enough to produce a polymer having a melting temperature up to 100° C. The polyether may contain one or more hydroxyl groups. It may be linear or branched. The polyether may contain terminal alkyl ester groups. Specific examples of suitable polyethers include poly(ethylene oxide), monoalkyl esters of a poly (ethylene oxide), poly(propylene oxide), monoalkyl esters of a poly(propylene oxide), ethylene oxide-propylene oxide copolymers and monoalkyl esters thereof, poly(tetramethylene oxide) and the like.

Useful polysiloxanes include, for example, poly(dimethyl siloxane) and copolymers thereof. The polysiloxane may be linear, branched or cyclic. Useful siloxane-poly(alkylene glycol) copolymers include, for example, poly(dimethyl siloxane-poly(ethylene glycol) copolymers that can have a block or graft structure.

Organic polymers having melting temperatures below 100° C. that are useful as a component of the carrier or mixture of carriers includes low molecular weight polyamides, low molecular weight polyethers, low molecular weight polystyrene, low molecular weight acrylate polymers and copolymers such as poly (ethylene glycol) methyl ether methacrylate (PEGMEA), polyacrylamide, poly(N-isopropylacrylamide), poly(acrylic acid), low molecular weight thermoplastic cellulose ethers and esters, poly(2-ethylacrylic acid), poly(vinylphosphonic acid), poly(sodium 4-styrenesulfonate), poly(2-ethyl-2-oxazoline) and the like.

Among the plasticizers are phthalate esters, trimellitate esters, adipate esters, maleate esters, benzoate esters, terephthalate esters, various fatty acid esters, epoxidized vegetable oils, sulfonamides, organophosphates, alkyl citrates, acetylated monogylcerides and the like.

The carrier may provide certain functional attributes to the cured composition. In some embodiments, the carrier provides increased hydrophobicity and/or oleophobic properties to the cured composition. It may also perform a plasticizing function.

Especially preferred carriers include polysiloxane oils, waxes and alcohol carriers. Especially preferred polysiloxane oils include octamethylcyclotetrasiloxane, decamethylcyclopentasiloxane, and linear or branchedpolydimethylsiloxane (PDMS) oil, polymethylhydrosiloxane (PMHS) oil, and other liquid cyclomethicones. Paraffin or beeswax waxes are especially preferred wax carriers. Stearyl and cetyl alcohol are especially preferred alcohol carriers and are solids at 22° C.

The carrier may also include low molecular weight organic compounds that have boiling temperatures below 100° C., but if such materials are present, they preferably constitute in the aggregate no more than 2 weight percent of the curable composition, and preferably no more than 1 weight percent or 0.25 weight percent thereof. These low molecular weight organic compounds include, for example, liquid polyethers and polyether mono alkyl esters such as PPG-14 monobutyl ester; liquid alkanes such as n-hexane, n-pentane, n-heptane, henicosane, docosane, tricosane, tetracosane, pentacosane, hexacosane, heptacosane, octacosane, nonacosane, triacontane and the like; liquid alcohols such as n-propanol, isopropanol, n-butanol, t-butanol, methanol and ethanol; fluorinated alkanes such as perfluorohexane, perfluoroheptane, perflurodecane-pinane, perfluorodecane-octane, perfluorododecane and the like; chlorinated alkanes and chlorinated aromatic compounds such as isoamyl chloride, isobutyl chloride and benzyl chloride; alkane diols and polyalkylene glycols such as ethylene glycol, propylene glycol, diethylene glycol, triethylene glycol, dipropylene glycol, tripropylene glycol and 1,4-butane diol; liquid esters such as diisopropyl sebacate and glycerol tripalmitate; ketones such as acetone and methyl ethyl ketone; liquid fatty acids such as stearic acid, oleic acid, palmitic acid, lauric acid and the like; 1-naphthalamine; biphenyl; benzophenone; diphenyl amine; 1,2-diphenylethane; maleic anhydride; pyrazine; thymol; glycerin; sorbitol or other sugars; and dibenzylidene sorbitol.

f) One or more finishing attribute chemicals. A "finishing attribute chemical" is a compound, other than the carrier and monomer(s), which remains with the substrate after the treatment process of the invention and imparts some desirable characteristic to the substrate. Examples of finishing attribute chemicals include, for example:

f-1) hydrophobic treatments, i.e., chemicals that impart water-repellency and/or hydrophobic characteristics to the treated substrate;

f-2) oleophobic treatments, i.e., substances that render the treated substrate not readily absorbent to fats and oils, or repellent to fats and oils;

f-3) super-hydrophobicity agents; i.e., substances that impart very high)(>130° contact angles of a water droplet with a surface of the treated substrate. The super-hydrophobicity agent may include solid particles sized from 50 nm to 100 microns such as powdered fluorocarbon polymer powders. Other super-hydrophobicity agents include chlorinated or fluorinated silicone compounds such as heptadecafluorodecyltrimethoxysilane, trimethoxy(1H,1H,2H,2H-heptadecafluorodecyl)silane, octadecyldimethylchlorosilane, tris(trimethylsiloxy)silylethyldimethylchlorosilane, octyldimethylchlorosilane, dimethyldichlorosilane, butyldimethylchlorosilane and trimethylchlorosilane.

f-4) Particulate solids that perform functions such as fillers, water scavengers, coloring agents, flame retardants, abrasives, rheology modifiers, and the like. Such particulate solids include, for example, silica gel particles, fumed silica, hydrophobic fumed silica, glass or other ceramic particles, polystyrene particles, polytetrafluoroethylene particles, poly(vinyl fluoride) particles, poly(vinylidene fluoride) particles, poly(hexafluoropropylene particles, poly(perfluoropropylvinylether) particles, poly-(perfluoromethylvinylether) particles, poly(chlorotrifluoroethylene) particles, polypropylene microspheres, mineral powders such as talc, iron carbonate and calcium carbonate, chitosan particles and flame retardant minerals, such as calcium carbonate, aluminum hydroxide, magnesium hydroxide, various borates, boron and/or phosphorous compounds and inorganic hydrates, titanium carbide, tungsten carbide, pumice, silicon carbide, zirconia alumina.

f-5) antimicrobial treatments, i.e., substances that inhibit microbial growth and/or kill microorganisms, including Cu, Zn, and Ag compounds f-6) UV absorbers and/or UV reflectors such as avobenzone, rutile titanium dioxide, silicon dioxide, homosalate, oxybenzone, 4-aminobenzoic acid (PABA), octisalate, octocylene, 2-ethylhexyl 4-dimethylaminobenzoate and the like;

f-7) Colorants such as dyes and pigments. These include acid dyes, reactive dyes, and disperse dyes.

f-8) Wrinkle-resisting agents, such as melamine-formaldehyde resins and urea-formaldehyde resins;

f-9) fabric softeners and anti-chafing agents, such as polydimethylsiloxane and polymethylhydrosilane;

f-10) Light and/or heat-reflecting materials such as reflective metal particles, titanium dioxide or ZnO particles and the like.

f-11) Emollients which create, for example, softness, wear comfort and/or moisturizing properties.

f-12) Insecticides and/or insect repellants, such as metofluthrin, transfluthrin, dichlovos, thyme oil, rosemary oil, citronella oil, cinnamon bark oil, lemon *eucalyptus* oil, lemongrass oil, and cedar wood oil.

f-13) Liquid flame retardants, including various organophosphorous, phosphorous-containing, bromine-containing and boron-containing compounds.

f-14) Trace forensic chemical markers that are added to the formulation to help detect counterfeit goods or counterfeit finishing treatment. Such markers may contain rare earth elements, such as yittrium, scandium, cerium, europium or erbium, or other elements not normally found in textiles, or compounds that provide detectable fluorescence when exposed to ultraviolet light.

The chemical treatment mixture may also include g) one or more promoters or activators for a polymerization catalyst and/or free radical initiator. Metal salts such as iron or vanadium salts and manganese ions or manganese are examples of such promoters.

The chemical treatment mixture may further contain h) one or more blowing agents. Suitable blowing agents include physical (endothermic) types which are liquids at 22° C. but volatilize under the conditions of the curing step, and physical types which decompose or otherwise react under the conditions of the curing reaction to form a gas. If an organic physical blowing agent is present, it should be used in small amounts such that the curable composition contains no more than 10%, preferably no more than 5%, more preferably no more than 2% and still more preferably no more than 1%, even more preferably no more than 0.25% by weight of organic compounds having a boiling temperature of less than 100° C. Chemical blowing agents preferably generate carbon dioxide or nitrogen; these include the so-called azo types, peroxy blowing agents such as peroxyesters, peroxycarbonates and the like, and certain carbamate and citrate compounds.

Component a) and b) monomers may together constitute, for example, 0.5 to 100%, of the weight of the curable composition. In some embodiments, the component a) and b) monomers together constitute at least 1%, at least 1.5%, at least 2%, at least 5%, at least 10%, at least 25% or at least 40% of the weight of the curable coating composition. Components a) and b) together may constitute up to 90%, up to 80%, up to 70%, up to 60%, up to 50%, up to 40%, up to 25%, up to 10% or up to 5% of the weight of the curable coating composition. Component b) in some embodiments constitutes 5 to 50%, 10 to 40%, 10 to 30% or 15 to 25% of the combined weight of components a) and b).

Component c) monomers may constitute up to 50% of the weight of the curable composition, provided that if the component c) monomer has a boiling temperature of less than 100° C., then it is present in an amount such that the curable composition contains no more than 2% by weight of organic compounds having a boiling temperature of less than 100° C. A preferred amount, if any are present, is 0.01 to 25% by weight, or 0.01 to 10%, of the weight of the curable coating composition if the component c) monomer boils below 100° C. In some embodiments, component c) monomers, if present at all, constitute up to 5%, up to 2% or up to 1% of the combined weight of components a), b) and c)

Free radical initiators, if present, may constitute up to 20% of the weight of the curable composition. A preferred amount is 0.1 to 10% by weight. A more preferred amount is 3-6% by weight of the curable composition. In some embodiments, the free radical initiator(s) present in an amount of up to 30% of the combined weight of components a), b) and c), such as 3 to 20% or 5 to 15% thereof. If the curable composition is to be plasma cured or radiation cured, it is possible to omit the free radical initiator.

The carrier or mixture of carriers, if present, may constitute, for example, 2 to 98%, of the weight of the curable composition. Carriers that are solid at 22° C. preferably are present in amounts of up to 150% of the weight of monomers (i.e., components a), b) and c)). Such solid carriers in some embodiments are present in an amount of at least 10%, at least 20% or at least 30% of the weight of monomers, and up to 150%, up to 125% or up 100% on the same basis. Waxes (carrier type (vi) above) in particular are preferably present in amounts as indicated in the previous sentence.

Liquid (at 22° C.) carriers may perform a dilution function and therefor in some embodiments may constitute as much as 98 weight-% of the curable composition, or a low as about 2 weight-% thereof. In specific embodiments, the curable composition may contain at least 5 weight-%, at least 10 weight-%, at least 25 weight-%, at least 40 weight-%, at least 50 weight % or at least 70 weight-% of one or more liquid carriers. It may contain up to 96 weight-%, up to 90 weight-%, up to 75 weight-%, up to 50 weight-%, up to 35 weight-%, up to 25 weight-% or up to 10 weight-% in specific embodiments Finishing attribute chemicals, when present, may in the aggregate constitute from 0.01 to 70%, preferably 0.01 to 25% and more preferably 0.01 to 10% of the weight of the curable composition. Forensic markers may be even lower, in the 1-1000 ppm level.

Other materials may in the aggregate constitute 0.01 to 70%, preferably 0.01 to 50%, more preferably 0.01 to 25%, and still more preferably 0.01 to 10%, of the weight of the curable composition.

A preferred curable composition contains 4 to 85% of component a), 2 to 25% of component b), 10 to 70%, more preferably 15 to 50%, of one or more carriers, and 0 to 35%, preferably 1 to 25% of one or more functional attribute materials. Another preferred curable composition contains 16 to 70% of component a), 3 to 20% of component b), 25-50% of one or more carriers, and 0 to 35%, preferably 1 to 25% of one or more functional attribute materials. Such preferred curable compositions contain 1 to 10 weight percent of one or more free-radical initiators. In some embodiments of such preferred curable compositions, component a) includes one or more acrylate or methacrylate monomers; component b) includes one or more monomers having 2 to 6 acrylate or methacrylate groups, component c) if present, includes one or more fatty acid acrylate compounds, and component e) includes one or more of a wax and a silicone oil.

A third preferred curable composition contains 1 to 75% of component a) and b) combined, wherein component b) constitutes 15 to 85% of the combined weights of components a) and b); 2 to 98% of one or more carriers, and 0 to 35%, preferably 1 to 25% of one or more functional attribute materials. In this preferred curable composition, the carrier preferably includes at least one liquid carrier and at least one solid (at 22° C.) carrier, and the solid carrier is preferably present in an amount of 10 to 150 weight-percent based on monomers (components a), b) and c). A fourth preferred curable composition contains 1 to 60% of components a) and b) combined, where component b) constitutes 20 to 65% of the combined weights of components a) and b), 30 to 100%, based on the weight of monomers, of one or more solid carriers, 2-98 weight-% of one or more liquid carriers, and 0 to 35%, preferably 1 to 25% of one or more functional attribute materials. These third and fourth preferred curable compositions preferably contains 3 to 20 or 5 to 15 weight percent of one or more free-radical initiators, based on the weight of monomers. In some embodiments of such third and fourth preferred curable compositions, component a) includes one or more acrylate or methacrylate monomers; component b) includes one or more monomers having 2 to 6 acrylate or methacrylate groups, component c) if present, includes one or more fatty acid acrylate compounds, and component e) includes one or more of a wax and a silicone oil.

An especially preferred curable composition (including the preferred compositions just described in the preceding two paragraph) includes at least one solid (at 22° C.) component a) monomer and at least one liquid (at 22° C.) component a) monomer. The solid component a) monomer(s) may constitute 20-85% or 20 to 65% of total weight of all component a) monomers. In such a composition, the solid component a) monomer may include a fatty acid acrylate in which the fatty acid group contains 18 or more carbon atoms, and the liquid component a) monomer may be a fatty acid acrylate in which the fatty acid group contains up to 16 carbon atoms and/or a fatty acid methacrylate in which the fatty acid group contains up to 18 carbon atoms. Such an especially preferred curable composition may contain 3-20% of component b). The component b) material in such a composition may include one or more of an alkane diol diacrylate, a pentaerythritol or dipentaerythritol polyacrylate and a drying oil such as linseed, safflower or tung oil. This especially preferred curable composition may contain 20-50% of component e), where component e) preferably includes at least one of a fatty alcohol, a wax and a silicone oil. This especially preferred curable composition may optionally contain 1-25% of at least one finishing attribute chemical, and may contain up to 2% of a component c) monomer (if any at all).

The curable composition can be prepared by simple mixing of the ingredients. It is often advantageous to heat the ingredients as they are mixed, especially when low-melting materials (such as, for example, component c) and certain carriers which are solid at room temperature) are present. The order of addition is generally not important, except that if a free-radical initiator is included, it preferably is added at the end after the composition has cooled to close to room temperature. A preferred method of forming the composition is to combine them and heat the mixture to 60 to 100° C. with agitation, to allow the low-melting ingredients to melt and mix with the liquid ingredients. After the ingredients have mixed, the mixture then is preferably cooled with stirring.

As the mixture cools, certain of the higher-melting ingredients may re-solidify. In such a case, it is preferred that those ingredients re-solidify in the form of discrete particles, rather than as a continuous or co-continuous phase which can cause the entire composition to become solid. Continued agitation during the cooling process and even for some time afterward has been found in some cases to prevent the composition from being entirely solidified due to the re-solidification of the higher melting point ingredients.

The physical form of the product at 22° C. is, therefore, a liquid or a suspension of solid particles in a continuous phase that is liquid. The liquid may be a single-phase liquid, or may consist of two or more discrete or co-continuous phases. The liquid preferably is only slightly viscous, having, for example, a viscosity of at least 25 cps, preferably at least 50 cps at 22° C. The viscosity of the liquid phase preferably is not greater than 50,000 cps, more preferably not greater than 5,000 and still more preferably not more than 1,000 cps and even more preferably no more than 200 cps at 22° C.

The solid phase, if any, will include high-melting ingredients, which do not melt during the mixing step, as well as any low-melting ingredients which re-solidify as discussed before.

Substrates

In the broadest sense, the substrate can be any fibrous material that is capable of being carried through the coating process and the polymerization process. By "fibrous", it is meant that a surface of the substrate to which the chemical treatment mixture is applied is made up of or includes fibers of at least one type. The fibers define interstitial void spaces in which air is entrapped and into which the applied chemical treatment mixture can penetrate.

The substrate preferably is a porous fabric characterized in having, prior to coating in accordance with the invention, an air permeability of at least 25 cubic foot/minute/square foot as measured according to ASTM D737, using a Textest FX 3300 instrument and a 38 cm$^2$ test area. More preferably, the porous fabric has an air permeability of at least 50, at least 75, at least 100 or at least 130 cubic feet/minute/square foot. The air permeability of the porous fabric may be any higher value, such as up to 200 cubic feet/minute/square foot.

The fibers may be, for example, woven, knitted, entangled, knotted, felted, glued or otherwise formed into a fabric, non-woven or textile having sufficient mechanical integrity to be carried through the process of the invention. Such a fabric includes fibers that may be, for example, a natural fiber such as cotton, hemp, wool, linen, silk, tencel, rayon, bamboo, cellulose and the like, or a synthetic fiber such as nylon, aramid, polypropylene, polyester (including PET), polyacetate, polyacrylic, polylactic acid, cellulose ester or other fiber and blends of any two or more of the above. It may a smooth or fleeced fabric and it may contain a stretchable fiber, such as Elastane, Lycra, or Spandex.

Flexible materials are preferred substrates, although 3-dimensional substrates, such as shoes can also be treated in this manner. When the substrate is in the form of a sheet, it should have a thickness of no greater than about 12 mm, and preferably has a thickness of no greater than 10 mm or no greater than 8 mm. The substrate can have any smaller thickness provided it has enough mechanical integrity to be conducted through the process. The curable composition in some embodiments is applied onto textile roll goods that may have widths of 100 mm or more, such as 300 mm up to 7 meters or more.

In other embodiments, including, but not limited to shoes, the substrate may be coated on one side as is the case, for example, with leather, or synthetic leather products, such as vinyl, or for athletic shoes, polyester, polypropylene or nylon, including mixtures of synthetic and natural fibers, which have an exposed fibrous surface on the side that is coated. The substrate may be a nonwoven, or a cellulosic material such as paper, tissue paper or cardboard and the like.

Preferred Coating Processes

A substrate is coated in accordance with the invention by applying the coating composition and curing the composition on the substrate. Because the curable composition is a liquid or suspension, it can be applied to a fibrous substrate by any many convenient methods, such as by rolling, brushing, spraying, immersing the textile into the composition, applying a puddle and scraping the composition into the textile using, for example, and air knife or doctor blade, and the like. Immersion methods can be used when the curable coating composition contains large amounts of a liquid carrier. Immersion methods are generally followed by compressing the coated fabric to remove excess fluid before curing. A particularly useful way of applying it, especially in a continuous industrial process, is to roll it onto the substrate using a roller. The curing composition in such cases is applied to the roller in any convenient manner and transferred to the substrate by contacting the substrate with the roller. Another industrially useful way of applying the coating composition is to spray it onto the substrate using any suitable spraying device. It is preferable that the application method be capable of uniform application across the width of the substrate and also be capable of repeatedly applying a desired chemical coating weight in units of several grams per square meter, as defined below.

It has been found that particularly good results can be obtained if the curable composition is caused to penetrate into or between the fibers of the fibrous substrate before and/or during curing. There are several convenient ways of doing this. One way is simple mechanical compression, as may be applied, for example, using one or more sets of rollers (such as one or more nip rollers) which may be heated, a press or other mechanical apparatus. This step, if used, should be performed before the curing composition has polymerized significantly. This step may also remove air trapped in the interstitial void spaces between fibers in the substrate, as discussed more fully below.

Conditions during the step of applying the curable composition to the substrate preferably are selected such that little or no curing of the monomer(s) occurs until the composition has been applied onto the substrate. Preferably, no more than 10 mole-percent of the monomers are polymerized before the completion of the coating step. As used herein, "curing" and "polymerization" are used interchangeably. If the chemical treatment mixture contains a heat-activated free radical initiator, temperature conditions during the chemical application step preferably are maintained below the 1 hour half-life temperature of the free radical initiator until the composition has been applied onto the substrate. In addition, it is preferred that no other source of free radicals (such as those described below) is present during the coating step.

A preferred coating weight is 1 to 70 g/m², especially 2 to 50 g/m² or 3 to 15 g/m². For example, for heavier substrates (especially porous fabrics), the coating weight may be, for example, 6 to 15 g/m², whereas for lighter substrates (especially porous substrates), the coating weight may be 1.5 to 10 or 1.5 to 5 g/m². Higher coating weights can be applied using two or more chemical transfer apparatuses in series or by passing the substrate through a chemical transfer apparatus multiple times. A significant advantage of this invention is that very low coating weights are easily applied.

In general, the polymerization step is performed by subjecting the coated substrate to a source of free radicals. Free radicals can be provided in several ways. If the coating composition contains a heat-activated free-radical initiator, free radicals can be provided by heating the coated substrate to a temperature at which the free radical initiator generates free radicals, as discussed more fully below. Heating of the coated substrate may be done in an oven (such as by passing the coated substrate through the oven on a moving platform or tenter frame), by contacting the coated substrate with a heated surface such as one or more heated rollers, by blowing hot gas onto or through the coated substrate or by alternative means such as exposing the coated substrate to ultraviolet or microwave energy, or by any combination thereof.

When using a thermal curing process as just described, preferred curing temperatures are in general from 105 to 210° C., preferably 125 to 190° C. and more preferably 130 to 180° C. It is generally advantageous in such thermal curing processes to heat the coated substrate to the elevated temperature for a time sufficient to decompose at least 50 mole-percent, more preferably at least 75 or at least 85 mole-percent, of the free radical initiator to form free radicals. The temperature and time needed is related to the decomposition rate constant for the particular free radical initiator. Additionally, the time required is inversely related to temperature, such that lower times are needed to attain a given amount of decomposition of the free radical initiator as the temperature is increased.

Figure 2:
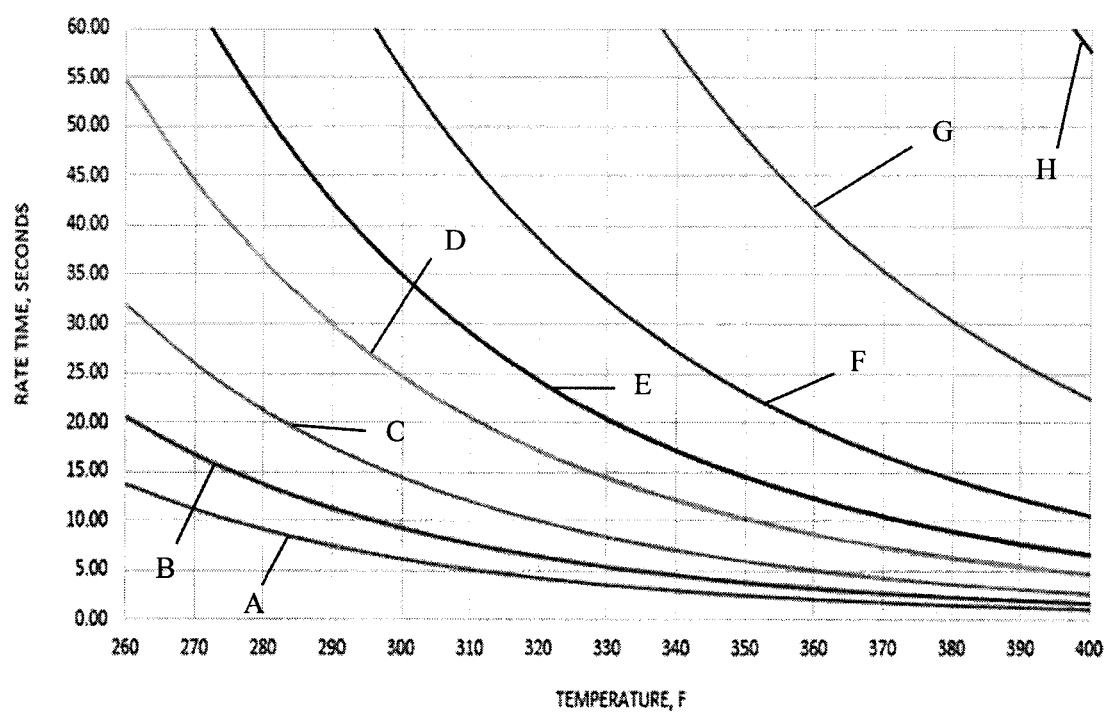
FIG. 2 is a series of time-temperature decomposition curves for lauryl peroxide, showing time and temperature conditions needed to decompose specified proportions of lauryl peroxide.

FIG. 2 illustrates the time-temperature relationship for an illustrative free radical initiator, lauroyl peroxide, which has a 1 minute half-life temperature at approximately 120° C. Lines A-H represent combinations of time and temperature needed to decompose 50, 60, 70, 80, 85, 90, 95 and 98 mole-%, respectively, of lauroyl peroxide. Conditions above and to the right of any given line, a greater level of decomposition is seen. Thus, for example, to decompose 90% of lauroyl peroxide at 180° C. (370° F.), a heating time of approximately 17 seconds is necessary.

In the thermal curing method, it is generally not necessary or desirable to maintain the elevated temperature once the free radical initiator has been decomposed as described above. Thus, in some embodiments, the coated fabric is first heated for a time and temperature necessary to decompose at least 50 mole-percent, preferably at least 85 mole-percent of the free radical initiator to produce free radicals. This may require a temperature of 105 to 210° C. and a time of 5 to 120 seconds, preferably 5 to 60 seconds, depending on the particular free radical initiator. During this time, a portion of the free radical polymerizable monomer may polymerize. Thereafter, the coated substrate can be removed from the heat source and polymerized in the absence of further applied energy. If desired, heating may continue if necessary until the conversion of monomer is, for example, at least 30% but not greater than 90%, followed by further polymerization in the absence of further applied energy. This reduces the exposure of the coating and the substrate to elevated temperatures that can damage the coating and/or the fabric. In addition, this reduces the energy requirements of the process, and can permit greater line speeds to be used and/or smaller heating apparatus.

By "absence of further applied energy", it is meant that no external energy is applied to the coated fabric that would produce free radicals. Therefore, the temperature is no more than and preferably less than the temperature of the polymerizing coating composition, which typically generates heat due to the exothermic polymerization reaction. In addition, no other significant source of energy is applied to the coated fabric (apart from incidental ambient radiation which does not exceed, for example, 1 W/m$^2$ and preferably does not exceed 0.5 W/m$^2$). Therefore, the subsequent polymerization may be preformed at a temperature of at most 50° C., in the absence of an applied plasma, the absence of more than 1 W/m$^2$ of UV radiation, and the absence of more than 1 W/m$^2$ of microwave radiation.

In another curing approach, the coated substrate may be contacted with a plasma that may be at approximately atmospheric pressure or may be a vacuum-based plasma. An applied plasma preferably contains no more than 1 mole percent, more preferably no more than 0.1 mole percent of oxygen (02). The plasma may be heated, for example, to temperatures as describe above with respect to the thermal curing method, or may be at a lower temperature. The plasma generates free radicals in the gas phase of the plasma. These radicals impinge the coated surface of the substrate, triggering the polymerization process.

If the coated substrate is maintained in contact with the plasma until the conversion of monomer is at least 30 mole percent but not greater than 90 mole percent, the substrate with the partially cured coating can then be further polymerized without further applied energy as described above. Once sufficiently triggered, the polymerization process will continue on its own, provided that the polymerizing substrate is kept in a low oxygen environment until the conversion of monomer is at least 50% and more preferably at least 80% or at least 90%. It is thus beneficial to move the substrate out of the plasma region and into a low oxygen environment for at least a portion of the ensuing polymerization process to continue. If the coated substrate is exposed to the plasma for too long, the energetic environment of the plasma may degrade the polymer. Therefore, this approach has the advantages of reducing the exposure of the coating and fabric to high levels of energy, and can permit faster line speeds, requires less plasma to be produced and therefore can permit smaller plasma generating equipment to be used. In this way, a "cool-down" machine section in which there is no plasma and only an oxygen-deficient gas environment provides additional benefit even for a non-equilibrium plasma that operates at close to ambient temperatures.

In still other embodiments, the coated substrate may be exposed to ultraviolet radiation, e-beam radiation or ionizing radiation source to produce free radicals. Alternatively, the treated substrate can be contacted with an additional component, not present in the curing composition, such as a spray of hydrogen peroxide, to generate free radicals for the curing reaction. Such a spray may contain one or more promoters or activators and/or a component g) material as described above.

In certain embodiments of the invention, the process includes steps of removing air from the interstitial void spaces of the substrate and performing at least a portion of the polymerization in a low oxygen environment. A low oxygen environment for purposes of this invention, means either or both of (i) an oxygen (02) partial pressure of no greater than 1 kPa, preferably no greater than 0.11 pKa and (ii) an atmosphere containing at most 1 mole-percent oxygen (02), preferably no more than 0.1 mole percent oxygen. The low oxygen environment for purposes of this invention may include a subatmospheric pressure such that the partial pressure of oxygen is as just mentioned. It may include an atmosphere that contains at least 98 mole-percent, preferably at least 99 mole percent and more preferably at least 99.9 mole percent, of an inert gas such as nitrogen, argon, carbon dioxide, steam, helium or a mixture of any two or more thereof, up to 1 mole percent, preferably not more than 0.1 mole percent oxygen, with the remainder being trace gases that are gasses at room temperature and 1 atmosphere pressure.

Polymerization in the low oxygen environment preferably continues until the conversion of monomer is at least 90%, at least 95% or at least 98%. If the polymerization step includes a heating step, it is especially preferred to cool the coated substrate, after curing, to a temperature of 50° C. or less in a low oxygen environment, before exposing it to air.

There are various ways to remove air from the interstitial void spaces of the porous fabric. In certain embodiments the coated substrate is mechanically compressed to force air from the interstitial void spaces. Such compression can be performed, for example, by compressing the coated fabric between rollers, one or both of which can be heated, by tensioning the coated fabric against a drum or other surface (which again can be heated), or otherwise. Mechanical compression can be performed under an inert atmosphere so that air and/or oxygen does not re-enter the void spaces upon removal of the compressive forces, Another way of removing air from the interstitial void spaces is to flow an inert gas through the fabric. The inert gas preferably contains no more than 1 mole percent oxygen ($O_2$), preferably no more than 0.1 mole percent oxygen. The composition of the gas preferably is at least 98 mole-percent, preferably at least 99 mole percent and more preferably at least 99.9 mole percent, nitrogen, carbon dioxide, argon, steam, helium or a mixture of any two or more thereof. The inert gas may be or include a plasma as described above. The inert gas may be heated, in which case the removal of air from the interstitial void spaces of the porous fabric can be performed at least partially simultaneously with the heating of the coated composition to decompose a free radical initiator. If the inert gas is or includes a plasma, the removal of such air can be performed at least partially simultaneously with the initiation of the polymerization step.

Another way of removing air is to place the substrate under vacuum.

The volatilization of a liquid from a surface of the substrate is another effective way of removing interstitial air. In such an embodiment, the liquid is applied to the fibrous substrate and at least partially volatilized, producing a vapor that is briefly at superatmospheric pressure. All or part of the liquid can be contained in the curable coating composition. Alternatively, it can be added to the fabric separately. The amount of applied liquid preferably is small, such as up to 75%, more preferably up to 55%, of the weight of the fibrous substrate. The liquid may contain a free-radical initiator and/or an activator or promoter, to promote polymerization.

During this step, one side of the wetted substrate may be in contact with a substantially impervious surface, whereas the other side of the wetted substrate is open to the atmosphere or in contact with a porous surface. The amount of liquid and the processing conditions preferably are such that the liquid is at least partially volatilizes in a short period such as less than 30 seconds, less than 20 seconds, less than 10 seconds and preferably 2 to 8 seconds. The volatilized material escapes through the fibrous substrate and in doing so displaces interstitial air. If the fibrous substrate is coated with the coating composition, it is believed the volatilized liquid also helps the coating composition to penetrate into and through the fibrous substrate. In this embodiment, the volatilization step preferably is performed while the wetted substrate is in a low oxygen environment as described above, so air and/or oxygen does not re-enter the fibrous substrate after the expansion of the volatile liquid is complete. Similarly, curing preferably is performed immediately thereafter or otherwise under conditions that prevent air and/or oxygen from reentering the fibrous substrate.

The liquid is preferably water or a mixture that contains water. The high heat of vaporization of water can provide a desirable heat sink effect that can moderate the temperature to which the substrate is heated. Alternatively or in addition, the volatile liquid may be a physical blowing agent that may be incorporated into the curable coating composition, or applied separately. Liquids that boil at 100° C. or less preferably are not included within the curable coating composition, and for that reason are separately applied to the fabric.

Another preferred liquid is a silicone oil, which may form part of the curable coating composition if it has a boiling temperature of greater than 100° C.

Combinations of the above approaches for removing air can be used. For example, the substrate can be wetted with the liquid and compressed to mechanically remove interstitial air while also volatilizing the liquid to produce a superatmospheric pressure gas that further helps to remove interstitial air. The fabric can be wetted with a liquid and heated with a hot inert gas (including a hot plasma) to force the interstitial air out mechanically through the flow of the inert gas or plasma while volatilizing the liquid to produce a superatmospheric pressure gas.

If the substrate is coated with the curable coating composition when the interstitial air is removed in any of these ways, some initiation of the curing step may occur during the step of removing the interstitial air.

Once the interstitial air is removed, the polymerization is at least partially performed in a low oxygen environment. The substrate preferably is maintained in a low oxygen environment from the time the interstitial air is removed until the conversion of monomer(s) is at least 50 mole-percent, more preferably at least 80 mole-percent, and more preferably at least 90 mole-percent. The polymerization may be continued in a low oxygen environment until at least 98 mole percent of the monomer(s) are converted to polymer.

In a particular embodiment, liquid water and the curing composition are applied (in either order or simultaneously) to the fibrous substrate, at some temperature below 100° C. The wetted and coated substrate is then heated under an inert atmosphere to a temperature sufficient to volatilize the water and produce steam. The steam expands and forces interstitial air from the fibrous substrate while optionally aiding the curing composition in penetrating through the substrate. The water is believed to exhibit a significant heat sink effect until it has vaporized. This moderates the temperature of the coated substrate to approximately 100° C. until most of the water has vaporized. This is a significant advantage, as the moderated temperature is believed to prevent the coating composition from curing until the interstitial air has been driven from the fibrous substrate and the curable composition has further penetrated through the substrate via the action of the expanding steam. Once the water has vaporized, the coated substrate is maintained under the inert atmosphere and the elevated temperature. Once the water has vaporized, the temperature of the coated substrate will increase to a higher temperature as described before, at which time the curing composition cures rapidly.

An example of a suitable apparatus for conducting this particular embodiment of the process is described in FIG. 1. Coating line 1 includes supply roller 2 from which fibrous substrate 3 is fed into the coating process. Take up drive roller 4 or equivalent device moves fibrous substrate 3 through the process. An optional series of rollers 5 or equivalent devices can provide tensioning and/or feed control. A coating composition as described herein is supplied through line 8 and applied to fibrous substrate 3 at coating station 6. Water is also optionally applied to fibrous substrate 3 at coating station 6. The coated and optionally wetted substrate 3 is taken into heated curing station 11. The atmosphere in curing station is a low oxygen environment as described above, such as nitrogen gas that contains at least 98 mole-percent nitrogen and 1 mole-percent or less, preferably 0.3 mole-percent or less or 0.1 mole-percent or less of oxygen. Curing station 11 has an inert atmosphere. In the embodiment shown in FIG. 1, such a gas is supplied into curing station 11 via line 7. Blower 14 circulates the gas through curing station 11 and cooling station 13 in the embodiment shown.

In the specific embodiment shown, coated and optionally wetted substrate 3 passes over hot roller 9. Hot roller 9 is at a temperature greater than 100° C. Hot roller 9 preferably has a gas-impervious surface. One side of coated and optionally wetted substrate 3 is in contact with hot roller 9 and becomes heated. The opposite side of coated and optionally wetted substrate 3 is open to the atmosphere inside curing station 11. As coated substrate 3 passes over hot roller 9, the water volatilizes and produces steam (if water is applied), while at the same time moderating the temperature of coated and optionally wetted substrate 3 so little or no curing occurs until the steam has been produced. Any steam that is produced escapes from the open side of coated and optionally wetted substrate 3, driving interstitial air from the substrate into the inert atmosphere inside curing station 11. A portion of the curable coating composition may volatilize during this step.

In the particular embodiment shown, the coated substrate 3 is then passed over second hot roller 10, where it is heated to the curing temperature. Second hot roller 10 is optional;

the optional production of steam and heating to the curing temperature both can be done on first hot roller 9 through proper selection of roller size, temperature and line speed. Similarly, any larger number of hot rollers can be used. Additionally, other apparatus can be used instead of hot rollers 9 and 10 to heat the coated and optionally wetted substrate (in which case hot rollers 9 and 10 may be omitted). For example, the entire curing station 11 may be heated, or the gas introduced through line 7 may be heated to provide the necessary temperature. For examples, by alternate winding of substrate 3 around rollers 12, substrate 3 may be repositioned to not contact hot rollers 9 or 10. By doing so, the substrate 3 will only be cured by the heated, convective, oxygen-deficient gas that is present inside curing station 11.

The curable coating composition is cured to a monomer conversion of at least 50%, preferably at least 80% or at least 90%, in curing station 11. Upon reaching the requisite amount of curing, the coated substrate is removed from curing station 11 and is transferred to cooling station 13. Cooling station 13 preferably includes a low an oxygen-deficient gas environment. Further polymerization may occur in cooling station 13. It is preferred that at least 80% or at least 90% of the monomers (and as much as 100%) have been converted to polymer before the coated fabric is removed from cooling station 13. The resulting coated fabric 3 is then wound onto the take-up roll 4.

The polymer formed by polymerizing the monomer(s) may fully or partially encapsulate the yarn or fibers that make up the substrate. The polymer may penetrate the yarn and/or the fibers and form a chemical bond to the yarn or fibers in some embodiments. In embodiments in which the curable coating composition contains a finishing attribute chemical, this polymer often serves as a binder that affixes the finishing attribute chemical to the substrate. Thus, the finishing attribute chemical in some embodiments becomes dissolved or anchored using the polymer formed by curing the monomer(s).

Coated fibrous substrates made in accordance with this invention are useful in applications in which water and/or oil repellency are desired, such as water or stain-repellent treatments, moisture barriers, battery and fuel cell separators, bandages, antimicrobial fabrics, carpet stain and fade protection, wall and window furnishings, body armor and other para-aramids for ballistic or fire protection, rain gear and outdoor furniture coverings and upholstery, leather or canvas shoe and boot treatments, athletic shoes, headwear, capes, uniforms and other apparel, leather upholstery and apparel and other automotive and furniture upholstery, tents, awnings and tarpaulins, umbrellas, hospital scrubs and gowns, medical covers, blankets and bedding, mattress ticking, automotive nonwovens, outdoor performance and sports apparel, including but not limited to outerwear and sweatshirts.

The following examples are intended to illustrate the invention but not to limit the scope thereof. All parts and percentages are by weight unless otherwise indicated.

EXAMPLE 1

A non-fluorocarbon, laundry-durable, water-repellent treatment is made for application on 100% polyester fleece by mixing the following ingredients:

Component a): 4.1 g stearyl methacrylate (liquid), 4.1 g lauryl acrylate (liquid), 15 g octadecyl acrylate (solid)

Component b): 4.7 g 1,6-hexanediol diacrylate, 1.4 g dipentaerythritol penta-/hexa acrylate, 4.3 g linseed oil Component e): 9.1 g paraffin wax, 10.8 g decamethylcyclopentasiloxane.

These ingredients are heated to 83° C. and form clear, yellow solution. The solution is allowed to cool to room temperature, and 2.5 g lauroyl peroxide (component d) is added with further mixing.

If this material is then left to sit at room temperature, it solidifies, possibly due to the solid materials (such as octadecyl acrylate) forming a continuous or co-continuous phase. However, by stirring the material for several hours, a suspension of solid particles within a liquid phase instead forms. The solid phase of the suspension may contain particles of the paraffin wax and/or the octadecyl acrylate.

0.8 to 1.6 mL of this suspension is applied to the face side of a 20 cm×20 cm (about 8"×8") swatch of 100% polyester fabric using a paint roller. The mixture is cured by heat-pressing the coated fabric for 60 seconds on a heat plate operated between 120 to 205° C. A light water spray is applied to the surface of the fabric before curing it to generate steam as it is heated. The treatment provides durable water-repellent treatment without the use of fluorocarbons and also had a nice "hand". No significant color change to the fabric is observed. Additional oven-curing is not necessary, but doing so increases durability during multiple laundry cycles. These samples withstand more than 65 sequential wash/dry cycles without any observable water repellency degradation. Each wash/dry cycle consists of a machine wash step in a 41-minute gentle cycle using cold water, Tide Free™ detergent and no softener, in a front loading machine using ambient temperature (cold) water. The drying step in each cycle is for 28 minutes in a front-loading dryer at delicate (low temperature) setting with no fabric softener. By contrast, a commercial, fluorocarbon-based "wet" treatment applied to the same fabric and subjected to the same laundry testing is fully removed by laundry exposure after only 30 wash/dry cycles.

EXAMPLE 2

A non-fluorocarbon, impermeable water-repellent treatment is made for application on 100% acrylic outdoor furniture fabric by mixing the following ingredients:

Component a): 2.2 g stearyl methacrylate (liquid), 2.3 g of lauryl acrylate, (liquid) 10.1 g octadecyl acrylate (solid)

Component b): 2.8 g of 1,6 hexanediol diacrylate, 0.8 g of dipentaerythritol penta-/hexa acrylate Component e:) 6.3 g paraffin wax, 7.3 g decamethylcyclopentasiloxane These ingredients are heated to 83° C. and form clear solution. The solution is allowed to cool to room temperature, and 1.5 g lauroyl peroxide (component d) is added with further mixing. This mixture is left stirring overnight on a cold stirring hotplate, resulting in a thick suspension, similar in consistency to the mixture of Example 1.

The face side of various 20 cm×20 cm (8"×8") swatches of 100% acrylic awning or outdoor furniture upholstery fabric each are coated with 2-3 mL of this suspension using a paint roller. A light water aerosol spray is applied to the surface of the coated swatches. The water is volatilized and the coating composition is cured by heat-pressing the moistened and coated swatches for 80 seconds on a heat press operated at 205° C. The heat press removes interstitial air and provides a low oxygen environment. The cured swatches are impermeable to penetration when sprayed with water continuously for 15 minutes.

EXAMPLE 3

Another curing composition was made in the same general manner described in Examples 1 and 2, using these ingredients:

Component a): 6.7 g of lauryl acrylate (liquid), 20.2 g octadecyl acrylate (solid)
Component b): 6 g of 1,6 hexanediol diacrylate, 2 g dipentaerythritol penta-/hexa acrylate, 5.3 g linseed oil
Component d): 3.4 g lauroyl peroxide
Component e): 14 g paraffin wax, 18.4 g decamethylcyclopentasiloxane All ingredients except the lauryl peroxide are heated on a hot plate until a solution forms, then are allowed to cool while being constantly stirred. When the temperature reaches to 40° C., the lauroyl peroxide is added and the mixture is continuously stirred for another 24 hours to, forming a suspension similar to those described in Examples 1 and 2.

Using a roller, 1 mL of the resulting suspension is coated onto both sides of several 20 cm×20 cm (8"×8") swatches of aramid fabric. The coated swatches are then sprayed with an aerosol spray of water and pressure-heated for 80 seconds at about 140° C. to volatilize the water and partially cure the composition. The samples are then oven-cured for 15 minutes at 123 C. The samples were able to withstand a pressurized spray of 10 L/min of water for 10 minutes with only 7.5% water absorption by weight.

One of the thus-treated samples is then coated on each side with a hot (65° C.) fluorocarbon liquid mixture that contains 0.7 g azobisisobutyronitrile and 9.2 g of 2-(perfluorohexyl) ethyl acrylate. The coated sample is then heat-pressed at 160° C. for 80 seconds without the prior addition of water spray to initiate curing. The heat press removes interstitial air and provides a low oxygen environment. The sample is then oven cured under air for 10 minutes at 125° C. to complete the curing. At the completion of the curing process, the coated aramid sample is resistant to dodecane penetration as well as water penetration, indicating both hydrophobicity and oleophobicity treatment.

EXAMPLE 4

A suspension is formed in the same general manner described in Examples 1-3 from the following ingredients:

Component a): 0.81 g stearyl methacrylate (liquid), 1.1 g lauryl acrylate (liquid), 4.8 g of 2-(perfluorohexyl) ethyl acrylate (liquid), 4.0 g octadecyl acrylate (solid)
Component b): 1.4 g 1,6 hexanediol diacrylate
Component d): 1.3 g azobisisobutyronitrile
Component e): 6.7 g paraffin wax, 3.6 g of decamethylcyclopentasiloxane
Component f): 4.2 g of PTFE "Teflon" micropowder (10-50 μm particle size).

After stirring overnight at room temperature, a thick white suspension forms. The PTFE micropowder does not dissolve. The slurry is applied to both sides of an aramid test sample using a roller. The coated sample is heat pressed at 160° C. for 80 seconds without the prior addition of water spray. The curing is completed by placing the sample in an oven for 10 minutes at 120° C. When fully cured, the polymerized coating resists dodecane penetration and water penetration.

EXAMPLE 5

A curable coating formulation is made by blending the following ingredients:

Component a): 20.145 g octadecyl acrylate (solid), 5.067 g lauryl acrylate (liquid)
Component b): 5.41 g 1,6-hexanediol diacrylate, 2.558 g dipentaerythritol penta-/hexa acrylate
Component d): 2.805 g lauroyl peroxide
Component e): 18.256 g decamethylcyclopentasiloxane, 12.103 g paraffin wax The curable coating formulation is coated onto a black, 100% polyester, double knitted fleece fabric having a weight of 240 g/m². The cured coating weight is 8 g/m². Air is forced from the sample by flowing a 99.7 mole-% nitrogen stream through the fabric. The coating is then thermally cured by heating the coated fabric to 110-150° C. under the same nitrogen atmosphere for about 45 seconds on a 188° C. hot plate, followed by further ambient temperature polymerization. The air permeability of the uncoated fleece is approximately 140 cubic foot/minute/ft², per ASTM D737. After applying and coating the fabric, the air permeability is 125-135 cubic feet/minute/ft². The coated fabric is designated Example 5.

The water repellency of the coated fabric is evaluated according to AATCC Test Method 22 Water Repellency Spray Test. In this test, a taut sample of the fabric is wetted with a 250 mL of a water spray over a 30-second period. The spray head is 4 cm from the sample, which is held at 45 degrees to the direction of water flow. The water produces a wetted pattern whose size depends on the relative repellency of the fabric. The numerical rating is established by comparing the wetted pattern with pictures on a standard chart. The fabric is rated on a scale of 0 to 100. A "0" rating indicates complete wetting on both sides of the fabric. A "100" rating indicates that the fabric after wetting has a non-wetted surface that has shed all visible water. The coated fabric of this example achieves a "100" rating. This result is very surprising for a coating formulation that does not contain fluorocarbons; competitive commercially available non-fluorocarbon fabric coatings typically do not achieve AATCC ratings in excess of "90".

The coated fabric is then put through 75 wash/dry cycles as described in Example 1. After these 75 wash/dry cycles, the fabric sample is weighed, and then evaluated on the AATCC Test Method 22 Water Repellency Spray Test. It again has a "100" rating. This indicates excellent coating durability. In this regard, it is noted that this excellent durability is achieved even though the coating composition in this case includes a paraffin wax, which would be expected to be removed at least partially during the rigors of multiple wash/dry cycles. Nonetheless, the product performance is virtually unchanged. The wetted sample is weighed again after being sprayed with water in the AATCC Test Method 22 Water Repellency Spray Test. The water weight gained is 0.020 milligrams.

For comparison, two samples of the same fleece material are coated in a pad-and-cure (wet) process using a coating composition based on perfluorooctylethyl acrylate in one case and perfluorohexylethyl acrylate in the other (the coated fabrics are designated Comparative Samples A and B, respectively). Each achieves an initial "100" rating on AATCC Test Method 22 Water Repellency Spray Test. However, the AATCC rating for Comparative Sample A drops to 80% after only 40 wash/dry cycles. After 40 wash/dry cycles, it absorbs about 0.25 mg of water, or about 12 times as much as Example 5 does after 75 wash/dry cycles. The AATCC rating for Comparative Sample B drops to 60 after only 30 wash cycles. It then absorbs over 0.4 mg of water, or about 20 times as much as Example 5.

As a further test of water repellency, Example 5 and the fluorocarbon-treated samples (Comparative Sample A and Comparative Sample B) are subjected to a light rain test after 75, 50 and 40 wash/dry cycles, respectively. In the light rain test, the AATCC water spray test is continued at the same rate of water spraying for 20 minutes with the fabric sample held perpendicular to the direction of water flow. The sample is weighed before and after the water spray. Example 5 gains 0.099 grams of water weight, whereas Comparative Samples A and B gain 0.156 and 0.908 grams of water weight, respectively, or about 9 to 15 times as much as Example 5.

For yet another test of water repellency Example 5, and the fluorocarbon-treated samples (Comparative Sample A and Comparative Sample B) are subjected to a heavy rain test after 75, 50 and 40 wash/dry cycles, respectively. In the heavy rain test, the water spray is concentrated in a funnel and allowed to drain from the funnel onto the fabric. Water flow is applied for 30 minutes with the fabric sample held perpendicular to the direction of water flow. The sample is weighed before and after the water spray. Samples treated using the formula and method described in Example 5 gain 1.038 grams of water weight and have an AATCC Test Method 22 spray rating of 80. Comparative Sample A gains almost 50% more water weight and has a spray rating of 50 to 70. Comparative Sample B gain over 5 grams of water weight and has a spray Rating of Only 50.

EXAMPLE 6

A curable coating formulation is made by blending the following ingredients:

Component a): 20.145 g octadecyl acrylate (solid), 5.067 g lauryl acrylate (liquid)

Component b): 5.41 g 1,6-hexanediol diacrylate, 2.558 g dipentaerythritol penta-/hexa acrylate Component d): 2.805 g lauroyl peroxide Component e): 18.256 g decamethylcyclopentasiloxane, 12.103 g paraffin wax The curable coating formulation is coated onto a black, 100% polyester, double knitted fleece fabric having a weight of 240 g/m$^2$. The coating weight is 8 g/m$^2$. The coated fabric is placed on a hot plate heated to 188° C. (370° F.). The apparatus is enclosed in a bag with air flowing through. The coating is then thermally cured for 45 seconds on the hot plate, then removed from the hot plate and allowed to cure further at room temperature under air. The estimated conversion of monomer when the coated fabric is removed from the hot plate is likely to be less than 50 mole-percent, due to oxygen inhibition. The final product (Example 6A) is subjected to the AATCC Test Method 22 (Water Repellency Spray Test) described in Example 5. It gains 0.654 grams of water weight.

Example 6A is repeated, except this time a 99 mole-% nitrogen/1 mole-% oxygen stream is forced through the coated fabric to remove interstitial air, and the heating step is performed under a 99 mole-% nitrogen/1 mole-% oxygen atmosphere. The cured sample (Example 6B) gains 0.202 grams of water on AATCC Test Method 22.

Example 6C is prepared in the same way, except the forced gas stream and curing atmosphere each are 99.7 mole-%/nitrogen/0.3 mole-% oxygen. The cured sample gains 0.099 grams of water on AATCC Test Method 22, indicating that the conversion of monomer to polymer is much more complete than in the previous 2 cases.

Example 6D is prepared in the same way, except the forced gas stream and curing atmosphere each are 99.9 mole-%/nitrogen/0.1 mole-% oxygen. The cured sample gains 0.034 grams of water on AATCC Test Method 22.

Example 6E is prepared in the same way, except the forced gas stream and curing atmosphere each are 99.97 mole-% nitrogen/0.03 mole-% oxygen. The cured sample gains 0.022 grams of water on AATCC Test Method 22.

Example 6F is prepared in the same way, except the forced air stream and curing atmosphere each are 99.98 mole-% nitrogen/0.02 mole-% oxygen. The cured sample gains 0.015 grams of water on AATCC Test Method 22.

These results show the significance of removing interstitial air and performing at least part of the polymerization in a low oxygen environment. The presence of oxygen during the polymerization has a large adverse affect on the performance of the coated fabric.

EXAMPLE 7

Octadecyl acrylate (29.9 parts), paraffin wax (17.9 parts), 1,6-hexanediol diacrylate (8.9 parts), lauryl acrylate (7.6 parts), dipentaerythritol penta/hexa acrylate (4 parts), decamethylcyclopentasiloxane (27.6 parts) and lauroyl peroxide (4.3 parts) are formed into a mixture. This is diluted further with decamethylcyclopentasiloxane in a 1:2 volume ratio. About 1 mL of the resulting mixture is sprayed onto both sides of an embossed polypropylene nonwoven fabric 200 mm×200 mm in size. 2 mL of perfluorohexylethyl acrylate is then sprayed on top of the curable coating composition.

Next, distilled water is sprayed onto the coated fabric. The fabric is enclosed in aluminum foil, and heated for about 106 seconds on a hot plate at 121° C. This vaporizes the steam to force out interstitial air. The atmosphere within the enclosed aluminum foil is then mainly water vapor; the aluminum foil prevents oxygen from re-entering the space. The cured sample exhibits a "100" rating on the AATCC Test Method 22 (Water Repellency Spray Test). It also passes AATCC Test Method 118 (Oil Repellency: hydrocarbon resistance test) for oils #5 and #6, indicating that the cured coating is highly oil-repellent as well as water-repellent.

When this experiment is repeated, except this time the perflurohexylethyl acrylate is applied to the fabric before the curable coating composition, equivalent results are obtained.

EXAMPLE 8

2 mL of a mixture consisting of 18% (by weight) octadecylacrylate, 30% paraffin wax, 4% Lauryl Peroxide, 27% decamethylcyclopentasiloxane, 4% dipentaerythitol penta/hex acrylate, 8% lauryl acrylate and 9% 1,6 hexanediol diacrylate is further diluted with 30 mL of decamethylcyclopentasiloxane to make a low viscosity liquid. This liquid is applied to both sides of triplicate samples of a tightly knitted stretch fabric consisting of 63% nylon, 25% polyester and 12% elastane.

All are heat-cured in an oven at 130° C. Sample 1 is cured for 15 minutes under air. Sample 2 is cured for 15 minutes by exposing it to a continuous flow of hot $N_2$ (containing 1000 ppm oxygen) at 130° C., and then keeping it under the nitrogen atmosphere for 1 minute before exposing it to air. Sample 3 is placed into a cold vacuum oven, which is then pumped down to remove air. The oven containing the sample is then filled with pure $N_2$ (50 ppm oxygen) and heated up to 130° C. Curing is performed in the $N_2$ oven w for 15 minutes, after which the hot sample is then immediately removed and exposed to air.

The samples each are then left exposed to air overnight and tested the for water repellency using the AATCC Test Method 22 (Water Repellency Spray Test). This visual rating is supplemented by measuring the weight of water added by the spray test, as described above. The results are summarized below:

| Sample No | Curing Method | $O_2$ impurity level, ppm | Cool down | Spray Rating (AATCC 22) | Weight of water added, g |
|---|---|---|---|---|---|
| 1 | air oven | ambient air | ambient air | 50 | 1.306 |
| 2 | flowing hot $N_2$ | 1000 | $N_2$ at 25 C. | 100 | 0.053 |
| 3 | hot $N_2$ in vac oven | 50 | ambient air | 90 | 0.115 |

A spray rating of 100 and a water weight addition of <100 mg is the desired result.

Sample 1 shows essentially no polymerization. Sample 2 exhibits a perfect spray test rating, despite the presence of 1000 ppm of $O_2$ during the curing step. Sample 3 showed results inferior to Sample 2, despite the better purity of the $N_2$ in the vacuum oven and the ability of the vacuum to remove oxygen from the closed environment. The reduced performance of sample 3 relative to #2 is attributed to the immediate exposure of the hot sample to air.

SPECIFIC EMBODIMENTS

Specific embodiments of the invention include the following:

1. A curable coating composition comprising
   a) at least one free-radical-curable monomer having exactly one polymerizable group per molecule, the free-radical-curable monomer having at least one hydrocarbyl group that has at least eight carbon atoms bonded directly or indirectly to the polymerizable group, wherein the hydrocarbyl group may be nonfluorinated, partially fluorinated or perfluorinated, the free-radical-curable monomer having a boiling temperature equal to or greater than 100° C., and
   b) at least one crosslinking monomer having at least two free-radical-curable polymerizable groups and a boiling temperature equal to or greater than 100° C.;
   wherein the coating composition at 22° C. is a liquid or a suspension of one or more solids in a liquid phase.

2. The coating composition of embodiment 1 which contains no more than 10% by weight of organic compounds that have boiling temperatures below 100° C. and no more than 5% by weight water, based on the entire weight of the coating composition.

3. The coating composition of embodiment 1 or 2 wherein each component a) monomer has a solubility in water of no greater than 1 part by weight per 100 parts by weight of water at 30° C., and water is soluble in each component a) monomer to the extent of no greater than 1 part by weight per 100 parts by weight of the component a) monomer at 30° C.

4. The coating composition of any of embodiments 1-3, wherein the polymerizable group of the component a) monomer(s) is an acrylate or methacrylate group.

5. The coating composition of any of embodiments 1-3, wherein the polymerizable group of at least a portion of the component a) monomer(s) is an alkenyl group.

6. The coating composition of any of embodiments 1-5, wherein the hydrocarbyl group of the component a) monomer(s) is an alkyl or alkenyl group containing 10 to 20 carbon atoms.

7. The coating composition of any of embodiments 1-6 wherein component a) is a mixture of at least one monomer that is a liquid at 22° C. and at least one monomer that is a solid at 22° C.

8. The coating composition of embodiment 7 wherein the solid component a) monomer(s) constitute 20 to 65% of total weight of all component a) monomers.

9. The coating composition of any of embodiments 1-8 wherein component b) includes at least one polyacrylate compound having 2 to 8 acrylate and/or methacrylate groups per molecule, at least one drying oil, or a mixture of two or thereof.

10. The coating composition of any preceding embodiment wherein component a) is one or more of hexyl acrylate, 2-ethylhexyl acrylate, n-octyl acrylate, 2-ethylhexyl methacrylate, n-octyl methacrylate, decyl acrylate, decyl methacrylate, lauryl acrylate, lauryl methacrylate, octadecyl acrylate, octadecyl methacrylate, 2-(perfluorohexyl)ethyl acrylate, 2-(perfluorooctyl)ethyl acrylate, 2-(perfluorodecyl) ethyl acrylate, 2-(perfluorohexyl) ethyl methacrylate, 2-(perfluorooctyl)ethyl methacrylate, lauryl methacrylate, stearyl methacrylate and 2-(perfluorodecyl)ethyl methacrylate.

11. The coating composition of any preceding embodiment wherein component b) includes one or more of 1,4-butanediol diacrylate, 1,6-hexanediol diacrylate, 1,8-octanediol diacrylate, cyclohexane dimethanol diacrylate, trimethylolpropane triacrylate, glycerin triacrylate, pentaerythritol tetraacrylate, dipentaerythritol tetraacrylate, diepentaerythritol hexaacrylate, 1,4-butanediol dimethacrylate, 1,6-hexanediol diamethcrylate, 1,8-octanediol dimethacrylate, cyclohexane dimethanol dimethacrylate, trimethylolpropane trimethacrylate, glycerin trimethacrylate, pentaerythritol tetramethacrylate, dipentaerythritol tetramethacrylate, diepentaerythritol hexamethacrylate, linseed oil, safflower oil and tung oil.

12. The curable coating composition of any preceding embodiment wherein b) constitutes 5 to 50% of the combined weight of components a) and b).

13. The coating composition of any preceding embodiment that further comprises at least one carrier.

14. The coating composition of embodiment 14 wherein the carrier or carriers each have a boiling temperature of at least 125° C.

15. The coating composition of embodiment 13 or 14, wherein the carrier or mixture of carriers has a melting temperature of 50° C. or less and a boiling temperature of at least 150° C.

16. The coating composition of any of embodiments 12-15 which includes at least one carrier that is a solid at 22° C. and at least one carrier that is a liquid at 22° C.

17. The coating composition of any of embodiments 12-16 wherein the carrier includes at least one fatty alcohol, wax or silicone oil or a mixture of any two or more thereof.

18. The coating composition of any of embodiments 12-17, wherein the carrier includes a wax having a melting temperature of 22 to 50° C. and a silicone oil.

19. The coating composition of any preceding embodiment, further comprising a heat- or UV-activated free radical initiator.

20. The coating composition of embodiment 19, wherein the free radical initiator is heat-activated and has a 1 minute or shorter half-life temperature at 100° C. in benzene.

21. The coating composition of embodiment 19 or 20, wherein the free radical initiator is heat-activated and has a half-life of at least 6 minutes at 100° C.

22. The coating composition of any of embodiments 19-21 wherein the heat activated radical initiator includes one or more of lauroyl peroxide, benzoyl peroxide, dicumyl peroxide, potassium persulfate, 1,1-bis(tert-butylperoxy)-3,3,5-trimethylcyclohexane or azobisisobutyronitrile.

23. The coating composition of any of embodiments 19-22 which contains 3 to 20% by weight of the free radical initiator(s), based on monomers.

24. The coating composition of any preceding embodiment which further comprises at least one finishing attribute chemical.

25. The coating composition of embodiment 24 which contains 0.01 to 25 weight percent of the at least one finishing attribute chemical.

26. The coating composition of embodiment 24 or 25 wherein the finishing attribute chemical is one or more of a hydrophobic treatment, an oleophobic treatments, a superhydrophobicity agent, a particulate solid, an antimicrobial agent, a UV absorber, a colorant, a wrinkle-resisting agent, a fabric softener, an anti-chafing agent, a light and/or heat reflecting material, an emollient, an insecticide, an insect repellant, a flame retardant or a trace forensic chemical marker.

27. The coating composition of any preceding embodiment which contains one or more finishing attribute chemicals selected from fluorocarbon polymer powders sized from 50 nm to 100 μm, chlorinated or fluorinated silicone compounds, silica gel particles, fumed silica, hydrophobic fumed silica, glass particles, ceramic particles, polystyrene particles, polytetrafluoroethylene particles, poly(vinyl fluoride) particles, poly(vinylidene fluoride) particles, poly(hexafluoropropylene particles, poly(perfluoropropylvinylether) particles, poly-(perfluoromethylvinylether) particles, poly(chlorotrifluoroethylene) particles, polypropylene microspheres, such as talc, iron carbonate or calcium carbonate powders, chitosan particles, calcium carbonate, aluminum hydroxide, magnesium hydroxide, borate compounds, inorganic hydrates, titanium carbide, tungsten carbide, pumice, silicon carbide, zirconia alumina, avobenzone, rutile titanium dioxide, silicon dioxide, homosalate, oxybenzone, 4-aminobenzoic acid (PABA), octisalate, octocylene, 2-ethylhexyl 4-dimethylaminobenzoate, acid dyes, reactive dyes, disperse dyes, melamine-formaldehyde resins, urea-formaldehyde resins, polydimethylsiloxane, polymethylhydrosilane, titanium dioxide, ZnO particles, metofluthrin, transfluthrin, dichlovos, thyme oil, rosemary oil, citronella oil, cinnamon bark oil, lemon *eucalyptus* oil, lemongrass oil, cedar wood oil, organophosphorous compounds, bromine compounds, boron-containing compounds and trace forensic chemical markers that contain a rare earth element.

28. The coating composition of any preceding embodiment which contains no more than 5% by weight of organic compounds that have boiling temperatures below 100° C. and no more than 1% by weight water, based on the entire weight of the coating composition.

29. The coating composition of any preceding embodiment which comprises: 4 to 85 weight-% of component a), 2 to 25 weight-% of component b), 15 to 50 weight-% of one or more carriers, 1 to 10 weight percent of one or more free-radical initiators and 0 to 35% of one or more functional attribute materials.

30. The coating composition of any preceding embodiment which comprises 16 to 70 weight-% of component a), 3 to 20 weight-% of component b), 25 to 50 weight-% of one or more carriers, 1 to 10 weight percent of one or more free-radical initiators and 1 to 25 weight-% of one or more functional attribute materials.

31. The coating composition of any preceding embodiment which contains 1 to 75 weight-% of component a) and b) combined, wherein component b) constitutes 15 to 85% of the combined weights of components a) and b); 2 to 98% of one or more carriers, and 0 to 35% of one or more functional attribute materials.

32. The coating composition of any preceding embodiment which contains 1 to 60 weight-% of components a) and b) combined, where component b) constitutes 20 to 65% of the combined weights of components a) and b), 30 to 100%, based on the weight of monomers, of one or more solid carriers, 2-98 weight-% of the total weight of the coating composition of one or more liquid carriers, and 0 to 35% of one or more functional attribute materials.

33. The coating composition of any preceding embodiment wherein component a) includes one or more acrylate or methacrylate monomers; component b) includes one or more monomers having 2 to 6 acrylate or methacrylate groups, and component e) includes one or more of a wax and a silicone oil.

34. The coating composition of any preceding embodiment wherein component a) is one or more of hexyl acrylate, 2-ethylhexyl acrylate, n-octyl acrylate, 2-ethylhexyl methacrylate, n-octyl methacrylate, decyl acrylate, decyl methacrylate, lauryl acrylate, lauryl methacrylate, octadecyl acrylate, octadecyl methacrylate, 2-(perfluorohexyl)ethyl acrylate, 2-(perfluorooctyl)ethyl acrylate, 2-(perfluorodecyl) ethyl acrylate, 2-(perfluorohexyl) ethyl methacrylate, 2-(perfluorooctyl)ethyl methacrylate, lauryl methacrylate, stearyl methacrylate and 2-(perfluorodecyl)ethyl methacrylate, component b) includes one or more of 1,4-butanediol diacrylate, 1,6-hexanediol diacrylate, 1,8-octanediol diacrylate, cyclohexane dimethanol diacrylate, trimethylolpropane triacrylate, glycerin triacrylate, pentaerythritol tetraacrylate, dipentaerythritol tetraacrylate and diepentaerythritol hexacrylate, and the coating composition further includes one or more free radical initiators that have a 6 minute or shorter half-life temperature at 100° C. in benzene, and a wax having a melting temperature of 22 to 50° C. or a mixture of said wax and a silicone oil.

35. The coating composition of any preceding embodiment which contains 10 to 35% by weight of a solid component a) monomer, 6 to 30% by weight of a liquid component a) monomer, 3-20% of component b) wherein component b) includes one or more of an alkane diol diacrylate, a pentaerythritol or dipentaerythritol polyacrylate and a drying oil such as linseed, safflower or tung oil, and 20 to 50% of component e), where component e) includes at least one of a fatty alcohol, a wax and a silicone oil.

36. The coating composition of any preceding embodiment which contains 10 to 35% by weight of one or more of hexyl acrylate, 2-ethylhexyl acrylate, n-octyl acrylate, 2-ethylhexyl methacrylate, n-octyl methacrylate, decyl acrylate, decyl methacrylate, lauryl acrylate, lauryl methacrylate, octadecyl acrylate, octadecyl methacrylate, 2-(perfluorohexyl)ethyl acrylate, 2-(perfluorooctyl)ethyl acrylate, 2-(perfluorodecyl)ethyl acrylate, 2-(perfluorohexyl)ethyl methacrylate, 2-(perfluorooctyl)ethyl methacrylate, lauryl methacrylate, stearyl methacrylate and 2-(perfluorodecyl) ethyl methacrylate, 3 to 20% by weight of one or more of 1,4-butanediol diacrylate, 1,6-hexanediol diacrylate, 1,8-octanediol diacrylate, cyclohexane dimethanol diacrylate, trimethylolpropane triacrylate, glycerin triacrylate, pentaerythritol tetraacrylate, dipentaerythritol tetraacrylate and diepentaerythritol hexacrylate, 1 to 10% by weight of one or more free radical initiators have a 6 minute or shorter half-life temperature at 100° C. in benzene, and 15 to 50% of a wax having a melting temperature of 22 to 50° C. or a mixture of said wax and a silicone oil.

37. The coating composition of any preceding embodiment wherein component a) includes at least one fluorine-containing monomer.

38. The coating composition of any of embodiments 1-36 which contains no more than 5% of a fluorine-containing monomer, based on the combined weight of all monomers.

39. The coating composition of embodiment 38 which contains no more than 1% of a fluorine-containing monomer, based on the combined weight of all monomers.

40. A method for coating a substrate, comprising applying a coating composition of any of embodiments 1-39 to at least one surface of the substrate and curing the coating composition by free radical polymerization to form a coated substrate.

41. A method for coating a substrate, comprising
1) applying liquid water and a curable coating composition of any of embodiments 1-39 to at least one surface of a fibrous substrate to form a moistened and coated fibrous substrate;
2) heating the moistened and coated fibrous substrate to briefly volatilize the water and produce steam at superatmospheric pressure in contact with the fibrous substrate;
3) simultaneously with and/or after step 2), curing the curing coating composition by free-radical polymerization to form a coated substrate.

42. The method of embodiment 41 wherein in step 1), no more than 55 percent of the weight of the fibrous substrate.

43. The method of embodiment 42 wherein the curable coating composition contains a heat-activated free radical initiator and the curing step is performed by heating the coated substrate.

44. A method for coating a substrate, comprising
1) applying a curable coating composition of any of embodiments 1-39 to at least one surface of a fibrous substrate to form a coated fibrous substrate;
2) heating the coated fibrous substrate in the presence of an oxygen-deficient gas or a blowing agent to produce a superatmospheric pressure gas in contact with the substrate;
3) simultaneously with and/or after step 2), curing the curing coating composition by free-radical polymerization to form a coated substrate.

45. The method of embodiment 44 wherein the curable coating composition contains a heat-activated free radical initiator and the curing step is performed by heating the coated substrate in an oxygen-deficient environment.

46. The method of embodiment 43 or 44 wherein the curable coating composition contains a UV-activated free radical initiator and the curing step is performed by exposing the coated substrate to ultraviolet light in an oxygen-deficient environment.

47. A method for coating a porous fabric having multiple intersecting fibers that define a web having air-filled interstitial void spaces, comprising
1) applying a curable coating composition to at least one surface of the porous fabric, wherein the curable coating composition contains at least one polymerizable monomer that polymerizes in the presence of free radicals;
2) before, simultaneously with or after step 1), removing air from the interstitial void spaces, and then
3) curing the curable coating composition on the porous fabric to form a porous coated fabric having a cured coating adherent to at least some of the intersecting fibers, wherein the curing is performed in the presence of free radicals and in a low oxygen environment until the conversion of monomer(s) is at least 50 mole-percent.

48. The method of embodiment 47, wherein the curing is performed in a low oxygen environment until the conversion of monomer(s) is at least 80 mole-percent.

49. The method of embodiment 48, wherein the curing is performed in a low oxygen environment until the conversion of monomer(s) is at least 90 mole-percent.

50. The method of any of embodiments 47-49, wherein the low oxygen environment includes an oxygen partial pressure of no greater than 1 kPa.

51. The method of any of embodiments 47-50 wherein in step 3), the partial pressure of oxygen is no greater than 0.1 kPa.

52. The method of any of embodiments 47-51, wherein the low oxygen environment includes an atmosphere that contains at most 1 mole-percent oxygen.

53. The method of any of embodiments 47-52, wherein the low oxygen environment includes an atmosphere containing no greater than 0.1 mole percent oxygen.

54. The method of any of embodiments 47-54 which is performed continuously.

55. The method of any of embodiments 47-54 wherein step 1) is performed continuously by moving the fabric through a coating station where the curable composition is applied to the fabric.

56. The method of any of embodiments 47-55 wherein step 2) is performed continuously by moving the fabric through an apparatus which removes air from the interstitial void spaces.

57. The method of any of embodiments 47-56 wherein step 3) is performed continuously by moving the fabric through a zone or zones where the applied curable coating composition is subjected to polymerization conditions.

58. The method of any of embodiments 47-57, wherein step 2) is performed under an atmosphere in which the oxygen partial pressure is no greater than 1 kPa.

59. The method of any of embodiments 47-58 wherein step 2) includes a step of compressing the coated porous fabric.

60. The method of embodiment 58, wherein at least a portion of step 3) is performed while the coated porous fabric is compressed.

61. The method of any of embodiments 47-60, wherein step 2) includes a step of forcing a gas having an oxygen content of 1 mole-percent or less into the interstitial void spaces of the porous fabric to displace air from the interstitial void spaces.

62. The method of embodiment 61 wherein in step 2), the gas forced into the interstitial void spaces of the porous fabric to displace air from the interstitial void space is nitrogen, argon, carbon dioxide, steam, helium or a mixture of any two or more thereof which contains 0.1 mole-percent or less of oxygen.

63. The method of any of embodiments 47-63, wherein step 2) includes a step of forcing a plasma having an oxygen content of 1 mole-percent or less into the interstitial void spaces of the porous fabric to displace air from the interstitial void spaces.

64. The method embodiment 63, wherein step 2) includes a step of forcing a plasma having an oxygen content of 0.1 mole-percent or less into the interstitial void spaces of the porous fabric to displace air from the interstitial void spaces.

65. The method of any of embodiments 47-64, wherein step 2) includes a step of placing the porous fabric under subatmospheric pressure.

66. The method of any of embodiments 47-65, wherein step 2) includes the steps of 2-a) applying a liquid to at least one surface the fabric to form a moistened and coated fabric and 2-b) heating the moistened and coated fabric to volatilize the liquid and produce vapor at superatmospheric pressure to displace air from the interstitial void spaces.

67. The method of embodiment 66 wherein the liquid is a component of the curable coating composition.

68. The method of embodiment 66 or 67 wherein the liquid includes decamethylpentasiloxane or octamethylcyclotetrasiloxane.

69. The method of embodiment 66 wherein the liquid is water.

70. The method of any of embodiments 47-69, wherein step 2) includes a step of compressing the fabric against one or more rollers.

71. The method of embodiment 70, wherein at least one of said rollers is heated.

72. The method of embodiment 71, wherein the curable coating composition contains at least one free radical initiator, and wherein in step 2), the coated fabric is heated on said heated roller or rollers for a time and temperature sufficient to decompose at least a portion of the free radical initiator and initiate polymerization of the at least one polymerizable monomer.

73. The method of embodiment 72, wherein the coated fabric is heated on said heated roller or rollers for a time and temperature sufficient to decompose at least 50 mole-% of the free radical initiator.

74. The method of any of embodiments 71-73, wherein the coated fabric is heated on said heated roller or rollers for a period of 5 to 120 seconds.

75. The method of any of embodiments 71-74, wherein the coated fabric is heated on said heated roller or rollers to a temperature of 105 to 210° C.

76. The method of any of embodiments 71-75, wherein at least a portion of step 3) is performed while the coated fabric is in contact with said roller or rollers.

77. The method of any of embodiments 71-76, wherein a portion of step 3) is performed while the coated fabric is in contact with said heated roller or rollers, the coated fabric is then removed from the heated roller or rollers, and the remainder of step 3) is subsequently performed.

78. The method of any of embodiments 47-77, wherein step 2) includes a step of exposing the coated fabric to convective hot gas having a oxygen content of 1 mole percent or less.

79. The method of embodiment 78, wherein the convective hot gas is heated to at least 120° C.

80. The method of embodiment 78 or 79, wherein the curable coating composition contains at least one free radical initiator, and wherein in step 2), the coated fabric is heated by the convective hot gas for a time and temperature sufficient to decompose at least a portion of the free radical initiator and initiate polymerization of the at least one polymerizable monomer.

81. The method of any of embodiments 78-80, wherein the coated fabric is heated by said convective hot gas for a time and temperature sufficient to decompose at least 50 mole-% of the free radical initiator.

82. The method of any of embodiments 78-81, wherein the coated fabric is heated by said convective hot gas for a period of 10 to 180 seconds.

83. The method of any of embodiments 78-82, wherein the coated fabric is heated by said convective hot gas to a temperature of 105 to 210° C.

84. The method of any of embodiments 78-83, wherein at least a portion of step 3) is performed while the coated fabric is exposed to said convective hot gas.

85. The method of any of embodiments 78-84, wherein a portion of step 3) is performed while the coated fabric is exposed to convective hot gas, the coated fabric is then removed from the hot gas region, and the remainder of step 3) is subsequently performed.

86. The method of any of embodiments 47-85 wherein step 3) is performed by exposing the coated fabric to conditions sufficient to initiate polymerization of the at least one polymerizable monomer in the curable coating composition and polymerize the at least one polymerizable monomer to at most 50% conversion to polymer and then continuing the polymerization without additional applied energy to a conversion of at least 80% of the at least one polymerizable monomer to polymer.

87. The method of embodiment 86 wherein the step of continuing the polymerization is at least partially performed in a low oxygen environment.

88. The method of embodiments 86 or 87, wherein the step of continuing the polymerization includes one or more of the following: 1) a temperature of at most 50° C., 2) the absence of plasma, 3) exposing the coated fabric to no more than 1 W/m$^2$ of UV radiation, and 4) exposing the coated fabric to no more than 1 W/m$^2$ of microwave radiation.

89. The method of embodiments 86-88, wherein the step of continuing the polymerization includes 1) a temperature of at most 50° C., 2) the absence of plasma, 3) exposing the coated fabric to no more than 1 W/m$^2$ of UV radiation, and 4) exposing the coated fabric to no more than 1 W/m$^2$ of microwave radiation.

90. The method of any of embodiments 47-89 wherein step 3) includes a step of contacting the coated fabric with a plasma to initiate polymerization of the at least one polymerizable monomer of the curable coating composition.

91. The method of embodiment 90, wherein in step 3) the coated fabric is maintained in contact with the plasma under conditions sufficient to polymerize at least 30 mole-% but less than 90% of the polymerizable monomer(s), the coated fabric is then removed from contact with the plasma, and the curable coating composition is further polymerized in the absence of a plasma.

92. The method of embodiment 91 wherein the further polymerization step includes a temperature of at most 50° C., exposing the coated fabric to no more than 1 W/m$^2$ of UV radiation, and exposing the coated fabric to no more than 1 W/m$^2$ of microwave radiation.

93. The method of any of embodiments 90-92, wherein the step of removing air from the interstitial void spaces is at least partially performed by contacting the coated fabric with the plasma.

94. The method of any of embodiments 47-93, wherein the curable coating composition includes a heat activated free radical initiator, and step 3) includes heating the coated fabric to an elevated temperature for a time sufficient to decompose at least 50 mole-percent of the free radical initiator to form free radicals.

95. The method of embodiment 94, wherein step 3) includes heating the coated fabric to an elevated temperature or to UV light for a time sufficient to decompose at least 85 mole-percent of the free radical initiator to form free radicals.

96. The method of embodiment 94 or 95, wherein the elevated temperature is 105 to 210° C. and the time is 5 to 120 seconds.

97. The method of any of embodiments 94-96, where said heating step is performed by contacting the coated fabric with a hot gas that contains no more than 1 mole-percent oxygen.

98. The method of embodiment 97, wherein the step of removing air from the interstitial void spaces is at least partially performed by contacting the coated fabric with a gas that contains no more than 1 mole-percent oxygen.

99. The method of any of embodiments 47-98, wherein the step of removing air from the interstitial void spaces is performed in advance of exposing the coated fabric to a plasma.

100. The method of embodiment 98, wherein the at least one polymerizable monomer is polymerized to a conversion of least 30 mole-% but less than 90% of the polymerizable monomer(s), the coated fabric is then removed from contact with the hot gas, and the curable coating composition is further polymerized in the absence of applied energy.

101. The method of embodiment 100 wherein the step the polymerization includes a temperature of at most 50° C., the absence of plasma, exposing the coated fabric to no more than 1 W/m$^2$ of UV radiation, and exposing the coated fabric to no more than 1 W/m$^2$ of microwave radiation.

102. The method of any of embodiments 47-101, wherein the curable coating composition includes a heat-initiated free radical initiator, and steps 2) and 3) include contacting the coated fabric with a hot gas that contains at most 0.1 mole percent oxygen to remove air from the interstitial void spaces and decompose at least a portion of the free radical initiator, polymerizing the at least one polymerizable monomer to a conversion of least 30 mole-% but less than 90% in the presence of the hot gas, then continuing the polymerization of the at least one polymerizable monomer at a temperature of 50° C. or below.

102.5. The method of any of embodiments 47-101, wherein steps 2) and 3) include contacting the coated fabric with a plasma that contains no more than 0.1 mole percent oxygen to remove air from the interstitial void spaces and initiate polymerization of the at least one polymerizable monomer, polymerizing the at least one polymerizable monomer to a conversion of least 30 mole-% but less than 90% in the presence of the plasma, then removing the coated fabric and continuing the polymerization of the at least one polymerizable monomer at a temperature of 50° C. or less.

103. The method of any of embodiments 47-102, wherein the curable coating composition includes a heat-initiated free radical initiator, and steps 2) and 3) include compressing the coated fabric against a heated roller to remove air from the interstitial void spaces and initiate polymerization of the at least one polymerizable monomer, polymerizing the at least one polymerizable monomer to a conversion of least 30 mole-% but less than 90% in the presence of the hot gas under an atmosphere that contains at most 1 mole-percent oxygen, then continuing the polymerization of the at least one polymerizable monomer at a temperature of 50° C. or less.

104. The method of any of embodiments 47-103 wherein step 3) includes a step of exposing the coated fabric to greater than 1 W/m$^2$ of microwave or ultraviolet radiation.

105. The method of any of embodiments 47-104 wherein, after step 1) but before the end of step 3), the coated fabric is embossed to create a 3-dimensional pattern on the surface of the fabric.

106. The method of embodiment 105 wherein the embossing step is performed by passing the coated fabric against a patterned roller.

107. The method of embodiment 105 or 106 wherein at least one portion of the raised pattern extends to a height of up to 1 mm above the fabric surface and/or a depth of at least 1 mm below the fabric surface.

108. The method of any of embodiments 104-107 wherein the 3-dimensional pattern forms channels for a liquid applied to the coated fabric to run off.

109. The method of any of embodiments 104-108 wherein the 3-dimensional pattern provides a means by which rain droplets break apart when they impact the coated fabric.

110. The method of any of embodiments 40-109, wherein the substrate or fabric includes knitted, woven, tufted, knotted, matted and/or entangled fibers.

111. The method of any of embodiments 40-110 wherein the substrate or fabric prior to coating has an air permeability of at least 25 cubic feet per minute per square foot as measured according to ASTM D737.

112. The method of embodiment 110, wherein the substrate or fabric prior to coating has an air permeability of at least 125 cubic foot/minute/square foot as measured according to ASTM D737.

113. The method of any of embodiments 40-112, wherein the air permeability of the coated substrate or fabric, as measured according to ASTM D737, is at least 75% as great as that of the uncoated substrate or fabric.

114. The method of embodiment 113, wherein the air permeability of the coated substrate or fabric, as measured according to ASTM D737, is at least 85% as great as that of the uncoated substrate or fabric.

115. The method of any of embodiments 40-114, wherein the air permeability of the coated substrate or fabric, as measured according to ASTM D737, is at least 75 cubic feet/minute/square foot.

116. The method of any of embodiments 40-115, wherein the wherein the air permeability of the coated substrate or fabric, as measured according to ASTM D737, is at least 110 cubic feet/minute/square foot.

117. The method of any of embodiments 40-116, wherein the weight of the applied coating composition is 1 to 15 g/m$^2$.

118. The method of any of embodiments 40-117 wherein the coated fabric has a rating of at least 90 on the AATCC Test Method 22 (Water Repellency Spray Test).

119. The method of any of embodiments 40-118 wherein the coated fabric has a rating of 100 on the AATCC Test Method 22 (Water Repellency Spray Test).

120. The method of any of embodiments 40-119 wherein the coated fabric passes AATCC test method 118 (Oil Repellency: hydrocarbon resistance test) for oils #5 and #6.

121. The method of any of embodiments 40-120, wherein the curable coating composition is a curable coating composition of any of embodiments 1-39.

122. A coated substrate or coated porous fabric produced in the method of any of embodiments 40-121.

123. A coated substrate made by applying the curable coating composition of any of embodiments 1-39 to at least one surface of a fibrous substrate, and curing the curable coating composition on the substrate.

124. The coated substrate of embodiment 123 wherein the substrate or fabric prior to coating has an air permeability of at least 75 cubic foot/minute/square foot as measured according to ASTM D737.

125. The coated substrate of embodiment 123 or 124, wherein the substrate or fabric prior to coating has an air permeability of at least 125 cubic foot/minute/square foot as measured according to ASTM D737.

126. The coated substrate of any of embodiments 123-125, wherein the air permeability of the coated substrate or fabric, as measured according to ASTM D737, is at least 75% as great as that of the uncoated substrate or fabric.

127. The coated substrate of embodiment 126, wherein the air permeability of the coated substrate or fabric, as measured according to ASTM D737, is at least 85% as great as that of the uncoated substrate or fabric.

128. The coated substrate of any of embodiments 123-127, wherein the air permeability of the coated substrate or fabric, as measured according to ASTM D737, is at least 75 cubic feet/minute.

129. The coated substrate of any of embodiments 123-129, wherein the wherein the air permeability of the coated substrate or fabric, as measured according to ASTM D737, is at least 110 cubic feet/minute.

130. The coated substrate of any of embodiments 123-129, wherein the weight of the applied coating composition is 1 to 15 g/m$^2$.

131. The coated substrate of any of embodiments 123-130 wherein the coated fabric has a rating of at least 90 on the AATCC Test Method 22 Water Repellency Spray Test.

132. The coated substrate of any of embodiments 123-131 wherein the coated fabric has a rating of 100 on the AATCC Test Method 22 Water Repellency Spray Test.

133. The coated substrate of any of embodiments 123-132 wherein the coated fabric passes AATCC Test Method 118 (Oil Repellency: hydrocarbon resistance test) for oils #5 and #6.

What is claimed is:

1. A method for coating a porous fabric having multiple intersecting fibers that define a web having air-filled interstitial void spaces, comprising
   1) applying a curable coating composition at a weight of 1 to 15 g/m$^2$ to at least one surface of the porous fabric wherein the curable coating composition comprises monomers that include a) at least one free-radical-curable monomer having exactly one polymerizable group per molecule, the free-radical-curable monomer having at least one hydrocarbyl group that has at least eight carbon atoms bonded directly or indirectly to the polymerizable group, wherein the hydrocarbyl group may be nonfluorinated, partially fluorinated or perfluorinated, the free-radical-curable monomer having a boiling temperature equal to or greater than 100° C., and b) at least one crosslinking monomer having at least two free-radical-curable polymerizable groups and a boiling temperature equal to or greater than 100° C.; and wherein the coating composition at 22° C. is a liquid or a suspension of one or more solids in a liquid phase
   2) after step 1), removing air from the interstitial void spaces, and then
   3) curing the curable coating composition on the porous fabric to form a porous coated fabric having a cured coating adherent to at least some of the intersecting fibers, wherein the curing is performed in the presence of free radicals and in an environment characterized by a partial pressure of oxygen of no greater than 0.1 kPa and/or an atmosphere containing no greater than 0.1 mole percent oxygen until at least 50 mole-percent of the monomers in the curable coating composition are converted to polymer, and
   wherein the porous coated fabric is maintained in an environment characterized by a partial pressure of oxygen of no greater than 0.1 kPa and/or an atmosphere containing no greater than 0.1 mole percent oxygen from the time the interstitial air is removed until at least 50 mole-percent of the monomers in the curable coating composition are converted to polymer, and
   further wherein i) step 3) includes a step of contacting the porous coated fabric with an atmospheric pressure plasma to initiate polymerization of the monomers of the curable coating composition and/or ii) the curable coating composition includes a heat activated free radical initiator and step 3) includes heating the porous coated fabric to an elevated temperature for a time sufficient to decompose at least 50 mole-percent of the free radical initiator to form free radicals.

2. The method of claim 1, wherein the curing is performed in an environment characterized by a partial pressure of oxygen of no greater than 0.1 kPa and/or an atmosphere containing no greater than 0.1 mole percent oxygen until at least 90 mole-percent of the monomers in the curable coating composition are converted to polymer.

3. The method of claim 1, which is performed continuously.

4. The method of claim 1, wherein a portion of step 3) is performed while the coated fabric is exposed to convective hot gas in a hot gas region, the coated fabric is then removed from the hot gas region, and the remainder of step 3) is subsequently performed.

5. The method of claim 1 wherein step 3) is performed by exposing the coated fabric to conditions sufficient to initiate polymerization of the monomers in the curable coating composition and polymerize the monomers to at most 50% conversion to polymer and then continuing the polymerization without additional applied energy to a conversion of at least 80% of the monomers to polymer.

6. The method of claim 1 wherein step 3) includes a step of contacting the coated fabric with a plasma to initiate polymerization of the monomers of the curable coating composition, the coated fabric is maintained in contact with the plasma under conditions sufficient to polymerize at least 30 mole-% but less than 90% of the monomers, the coated fabric is then removed from contact with the plasma, and the curable coating composition is further polymerized in the absence of a plasma.

7. The method of claim 1, wherein the curable coating composition includes a heat activated free radical initiator, and steps 2) and 3) include contacting the coated fabric with a hot gas that contains at most 0.1 mole percent oxygen to remove air from the interstitial void spaces and decompose at least a portion of the free radical initiator, polymerizing the monomers to a conversion of least 30 mole-% but less than 90% in the presence of the hot gas, then continuing the polymerization of the monomers at a temperature of 50° C. or below.

8. The method of claim 1 wherein, after step 1) but before the end of step 3), the coated fabric is embossed to create a 3-dimensional pattern on the at least one surface of the fabric.

9. The method of claim 1, wherein the fabric includes knitted, woven, tufted, knotted, matted and/or entangled fibers and the fabric prior to coating has an air permeability of at least 25 cubic feet per minute per square foot as measured according to ASTM D737.

* * * * *